US012675065B2

(12) United States Patent
Kojima

(10) Patent No.: US 12,675,065 B2
(45) Date of Patent: Jul. 7, 2026

(54) ELECTROPHOTOGRAPHIC BELT AND ELECTROPHOTOGRAPHIC IMAGE FORMING APPARATUS

(71) Applicant: CANON KABUSHIKI KAISHA, Tokyo (JP)

(72) Inventor: Hiroomi Kojima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 18/542,999

(22) Filed: Dec. 18, 2023

(65) Prior Publication Data

US 2024/0219861 A1 Jul. 4, 2024

(30) Foreign Application Priority Data

Dec. 28, 2022 (JP) ................................ 2022-211718

(51) Int. Cl.
*G03G 15/16* (2006.01)

(52) U.S. Cl.
CPC .................................. *G03G 15/162* (2013.01)

(58) Field of Classification Search
CPC .................................................... G03G 15/162
See application file for complete search history.

(56) References Cited

U.S. PATENT DOCUMENTS 9,058,010 B2 6/2015 Ito et al.
10,168,645 B2 1/2019 Yoshida et al.
(Continued)

FOREIGN PATENT DOCUMENTS

JP 2003-5538 A 1/2003
JP 2006-233150 A 9/2006
(Continued)

OTHER PUBLICATIONS

Nobuyuki Otsu, "A Threshold Selection Method from Gray-Level Histograms," SMC—9(1) IEEE Trans. Syst. Man Cybern. 62-66 (Jan. 1979).

*Primary Examiner* — Michael C Miggins
(74) *Attorney, Agent, or Firm* — Venable LLP

(57) ABSTRACT

An electrophotographic belt comprising a cylindrical film as a base layer, wherein the cylindrical film comprises a crystalline polyester, an amorphous polyester and a carbon black, a content ratio of the carbon black in the cylindrical film is 2.0% by mass or more, an average alignment degree Fc1 and an average alignment angle Φc1 of the carbon black in the circumferential direction of the cylindrical film are 0.30 or more and −10° to +10°, respectively, the cylindrical film has a first phase comprising the amorphous polyester and the carbon black, and a second phase comprising the crystalline polyester, and the second phase further comprises a (meth)acrylic resin having a structure represented by formula (a) below:

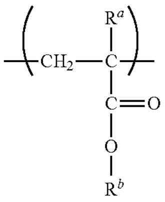

(a)

in formula (a), $R^a$ represents a hydrogen atom or a methyl group, and $R^b$ represents an alkyl group having 1 to 8 carbon atoms.

20 Claims, 7 Drawing Sheets

(56) References Cited

U.S. PATENT DOCUMENTS

| | | | |
|---|---|---|---|
| 10,866,543 | B2 | 12/2020 | Hamana et al. |
| 11,143,987 | B2 | 10/2021 | Yoshida et al. |
| 11,803,136 | B2 | 10/2023 | Kojima |
| 2022/0397844 | A1 | 12/2022 | Taya et al. |
| 2023/0143902 | A1 | 5/2023 | Kojima |
| 2023/0297009 | A1 | 9/2023 | Kojima |

FOREIGN PATENT DOCUMENTS

| | | | |
|---|---|---|---|
| JP | 2008-58815 | A | 3/2008 |
| JP | 2012-98709 | A | 5/2012 |
| JP | 2018-36624 | A | 3/2018 |
| JP | 2020-190720 | A | 11/2020 |
| JP | 2022-191167 | A | 12/2022 |

ELECTROPHOTOGRAPHIC BELT AND ELECTROPHOTOGRAPHIC IMAGE FORMING APPARATUS

BACKGROUND

Technical Field

The present disclosure relates to an electrophotographic belt and an electrophotographic image forming apparatus.

Description of the Related Art

In an electrophotographic image forming apparatus (hereinafter also referred to as an "electrophotographic apparatus"), an electrophotographic belt made of a thermoplastic resin and having an endless shape is used as a transport transfer belt that transports a transfer material or as an intermediate transfer belt. Such an electrophotographic belt is required to have high strength and conductivity, for example, in a range of $1\times10^{3}\Omega/\square$ to $1\times10^{13}\Omega/\square$ in terms of surface resistance.

In recent years, with an increasing need for smaller and lower cost copiers and printers, reduction in the number of components has been considered. Japanese Patent Application Publication No. 2012-098709 discloses an electrophotographic image forming apparatus in which a power source is used in common for primary transfer and secondary transfer and an intermediate transfer member having higher conductivity than before is used, thereby allowing an electric current to flow from one transfer power source in the circumferential direction of the intermediate transfer belt to perform primary transfer.

Japanese Patent Application Publication No. 2018-036624 discloses an electrophotographic image forming apparatus including a toner image bearing member that bears on the outer surface a toner image, an intermediate transfer belt, a current supply member that contacts the intermediate transfer belt, and a power source that applies a voltage to the current supply member. In this electrophotographic image forming apparatus, by applying a voltage from the power source to the current supply member a current is allowed to flow in the circumferential direction of the intermediate transfer belt to primary transfer the toner image from the toner image bearing member to the outer surface of the intermediate transfer belt.

The intermediate transfer belt includes a first layer having ionic conductivity and a second layer having electronic conductivity and lower electrical resistance than the first layer.

In the intermediate transfer belt used in such an electrophotographic apparatus, it is required that the inner circumferential surface has high conductivity in the circumferential direction. Japanese Patent Application Publication No. 2020-190720 discloses a problem of, when a conductive layer contains a large amount of an electronic conductive agent, a relative reduction in the content ratio of the binder resin in the conductive layer, whereby the adhesion of the conductive layer to the base layer is reduced. Japanese Patent Application Publication No. 2020-190720 discloses that such a problem can be solved by using a polyester having a specific structural unit.

Meanwhile, Japanese Patent Application Publication No. 2006-233150 (Examples 1 to 3) discloses that polyethylene naphthalate, polyethylene terephthalate, and two types of thermoplastic elastomers (product name: Pelestat 6321; manufactured by Sanyo Chemical Industries, Ltd., product name: Tuftec M1913; manufactured by Asahi Kasei Corporation) were used, and that by using such resins, even a preform containing a large amount of carbon black exceeding 10 parts by mass per 100 parts by mass of the resin components could be biaxially stretched, and a biaxially stretched cylindrical film that could be used for an intermediate transfer belt was obtained.

The present inventors have found that a biaxially stretched cylindrical film containing a crystalline polyester resin can have high strength because the crystals of the crystalline polyester are biaxially oriented in the circumferential direction and axial direction. From this, the present inventors predicted that the biaxially stretched cylindrical films according to Examples 1 to 3 of Japanese Patent Application Publication No. 2006-233150 would exhibit high electrical conductivity and excellent durability. However, when the biaxially stretched cylindrical film is used as an intermediate transfer belt, the inner circumferential surface thereof wears out relatively quickly because of friction between the inner circumferential surface and a group of rollers (driving rollers, tension rollers, etc.) that are in contact with the inner circumferential surface. As a result, slipping may occur between the inner circumferential surface and the roller group. The occurrence of such slipping can affect the quality of electrophotographic images.

SUMMARY

At least one aspect of the present disclosure is directed to providing an electrophotographic belt that contributes to stable formation of high-quality electrophotographic images. Further, at least one aspect of the present disclosure is directed to providing an electrophotographic image forming apparatus that can stably form high-quality electrophotographic images.

According to at least one embodiment of the present disclosure, there is provided an electrophotographic belt comprising a cylindrical film as a base layer, wherein the cylindrical film comprises a crystalline polyester, an amorphous polyester and a carbon black, a content ratio of the carbon black in the cylindrical film is 2.0% by mass or more, an average alignment degree Fc1 of the carbon black in a circumferential direction of the cylindrical film is 0.30 or more, and an average alignment angle Φc1 of the carbon black in the circumferential direction of the cylindrical film is −10° to +10° as observed in a square observation area of 5 μm in length×5 μm in width in a cross section of the cylindrical film in thickness and a direction along the circumferential direction of the cylindrical film, the cylindrical film has a first phase comprising the amorphous polyester and the carbon black, and a second phase comprising the crystalline polyester, and the second phase further comprises a (meth)acrylic resin having a structure represented by formula (a) below:

(a)

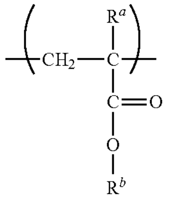

in formula (a), $R^a$ represents a hydrogen atom or a methyl group, and $R^b$ represents an alkyl group having 1 to 8 carbon atoms.

Furthermore, according to at least one embodiment of the present disclosure, there is provided an electrophotographic image forming apparatus including the above electrophotographic belt as an intermediate transfer belt. Further features of the present invention will become apparent from the following description of exemplary embodiments with reference to the attached drawings.

DESCRIPTION OF THE EMBODIMENTS

Figure 1:
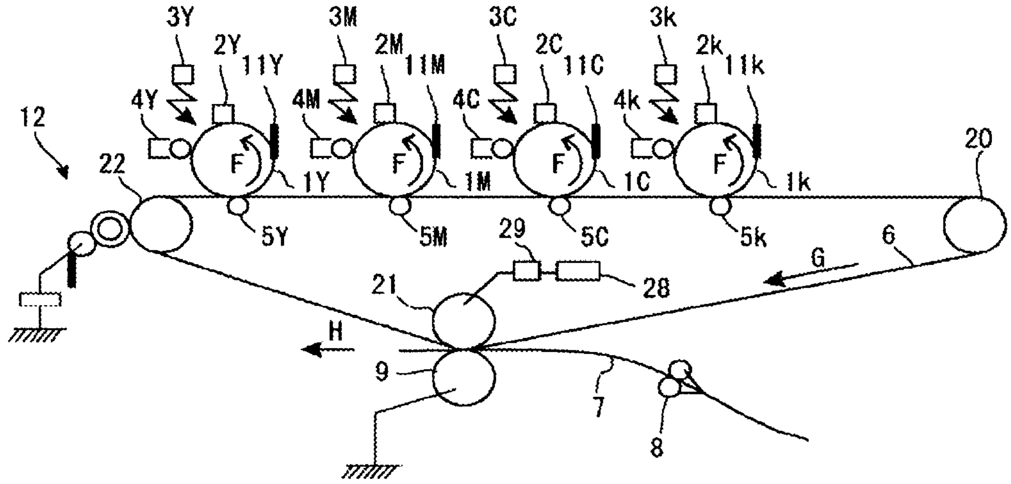
FIG. 1 is a schematic cross-sectional view showing an example of a full-color electrophotographic image forming apparatus using an electrophotographic process.

In the present disclosure the notations "from XX to YY" and "XX to YY" representing a numerical value range signify, unless otherwise specified, a numerical value range that includes the lower limit and the upper limit of the range, as endpoints. In a case where numerical value ranges are described in stages, the upper limits and the lower limits of the respective numerical value ranges can be combined arbitrarily. In the present disclosure, for instance, a wording such as "at least one selected from the group consisting of XX, YY and ZZ" encompasses XX, YY and ZZ, a combination of XX and YY, a combination of XX and ZZ, a combination of YY and ZZ, and a combination of XX, YY and ZZ.

Further, in the present disclosure, "Ω/□", which is a unit of surface resistivity, means "Ω/sq.". Furthermore, in the present disclosure, the (meth)acrylic resin includes at least one selected from the group consisting of acrylic resin and methacrylic resin.

Regarding the reason why the inner circumferential surface of the biaxially stretched cylindrical film according to Japanese Patent Application Publication No. 2006-233150 wears out relatively early, the present inventors speculate that this is due to low affinity of "Pelestat 6321" used as a thermoplastic elastomer and the crystalline polyester. That is, "Pelestat 6321" is a polyether ester amide. Polyether ester amides and crystalline polyesters have low affinity. Therefore, in the preform for forming a biaxially stretched cylindrical film according to Japanese Patent Application Publication No. 2006-233150, carbon black is unevenly distributed in the phase including the polyether ester amide, and carbon black is not in direct contact with the crystalline polyester. This suppresses rapid crystallization of the crystalline polyester with carbon black as the nuclei during the biaxial stretching of the preform. Therefore, it is thought that biaxial stretching was possible even for a preform containing the amount of carbon black required to exhibit conductivity.

However, the polyether ester amide, which prevents carbon black from coming into direct contact with the crystalline polyester, has low affinity with the crystalline polyester. Therefore, the interface between the phase including the polyether ester amide and the phase including the crystalline polyester is likely to peel off. It is considered that this causes the inner circumferential surface of the biaxially stretched cylindrical film according to Japanese Patent Application Publication No. 2006-233150 to wear out relatively early.

Accordingly, the present inventors conducted repeated studies in order to obtain an electrophotographic belt that can achieve both high electrical conductivity on the inner circumferential surface and excellent wear resistance on the inner circumferential surface at a higher level. As a result, it was found that the electrophotographic belt according to one aspect of the present disclosure described below can achieve the above contradictory properties at a higher level, and that even when the electrophotographic belt is used for long-term electrophotographic image formation, the outer circumferential surface is unlikely to peel off and excellent durability is demonstrated.

That is, an electrophotographic belt according to one aspect of the present disclosure comprises a cylindrical film as a base layer. The cylindrical film comprises a crystalline polyester, an amorphous polyester, a (meth)acrylic resin, and a carbon black. The content ratio of the carbon black in the cylindrical film is 2.0% by mass or more. Further, an average alignment degree Fc1 of the carbon black in a circumferential direction of the cylindrical film is 0.30 or more, and an average alignment angle Φc1 of the carbon black in the circumferential direction of the cylindrical film is −10° to +10° as observed in a square observation area of 5 μm in length×5 μm in width in a cross section of the cylindrical film in the thickness direction and a direction along the circumferential direction of the cylindrical film. Furthermore, the cylindrical film has a first phase comprising the amorphous polyester and the carbon black, and a second phase comprising the crystalline polyester and the (meth) acrylic resin. The methacrylic resin has a structure represented by the following formula (a).

(a)

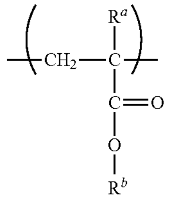

In formula (a), $R^a$ represents a hydrogen atom or a methyl group, and $R^b$ represents an alkyl group having from 1 to 8 carbon atoms.

Figure 8A:
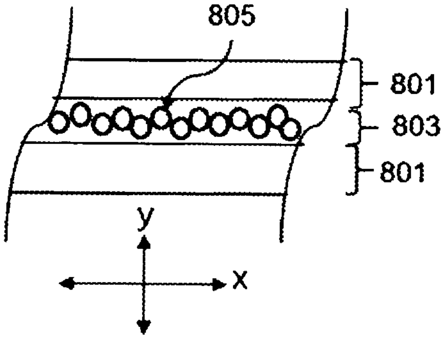
FIG. 8A is an explanatory view of the structure in a cross section in the thickness direction of the cylindrical film and the circumferential direction of the cylindrical film.

The configuration of an electrophotographic belt according to one aspect of the present disclosure will be described using FIG. 8A. FIG. 8A is an explanatory diagram of the structure in a cross section of the cylindrical film in the thickness and the direction along the circumferential direction.

In FIG. 8A, the x-axis indicates the circumferential direction of the cylindrical film, and the y-axis indicates the thickness direction of the cylindrical film. The cylindrical film has a second phase 801 comprising a crystalline polyester and a (meth)acrylic resin, and a first phase 803 comprising an amorphous polyester and carbon black 805. The carbon black 805 in the first phase 803 is oriented in the circumferential direction of the cylindrical film. As a result, high conductivity in the circumferential direction of the inner circumferential surface can be demonstrated with a relatively small amount of carbon black. As a result, the content ratio of a binder in the cylindrical film can be increased, so that the wear resistance of the inner circumferential surface can be improved.

Figure 6A:
FIG. 6A is a binarized image of the SEM image in a cross section of the cylindrical film in the thickness and a direction along the circumferential direction of the cylindrical film.

Further, as shown in FIG. 6A and FIG. 8A, in the cross section in the circumferential direction of the cylindrical film, the first phase 803 comprising carbon black and the second phase 801 extend in the circumferential direction of the cylindrical film to form a layered structure, so that the inner circumferential surface is unlikely to become rough even if the inner circumferential surface wears out. It is thought that this also contributes to making it more difficult for wear to progress on the inner circumferential surface.

Furthermore, it is thought that the (meth)acrylic resin comprised in the second phase further improves the adhesion of the interface between the first phase and the second phase. The reason why the (meth)acrylic resin in the second phase can further improve the adhesion of the interface between the first phase and the second phase is not clear, but it is thought that this is because the (—C(═O)O—) structure in the molecule of the (meth)acrylic resin interacts with the ester bonds of the crystalline polyester in the second phase, the ester bonds of the amorphous polyester in the first phase, and the polar groups on the surface of carbon black 805.

As a result, the cylindrical film according to one aspect of the present disclosure has excellent wear resistance because the interface between the first phase and the second phase has high adhesion even if the inner circumferential surface of the film rubs against the roller group. Furthermore, for the outer circumferential surface, the interface between the first phase and the second phase has high adhesion as well, for example, even when the outer circumferential surface is rubbed with a cleaning member such as a blade or a brush, so that peeling is unlikely to occur on the outer circumferential surface. As a result, it is possible to obtain an electrophotographic belt that contributes to the formation of high-quality electrophotographic images over a long period of time.

Hereinafter, an electrophotographic belt according to one aspect of the present disclosure will be described in detail. The present disclosure is not limited to the following aspect.

Electrophotographic Belt

The electrophotographic belt according to the present disclosure comprises a cylindrical film as a base layer.

Figures 5A, 5B, 5C:
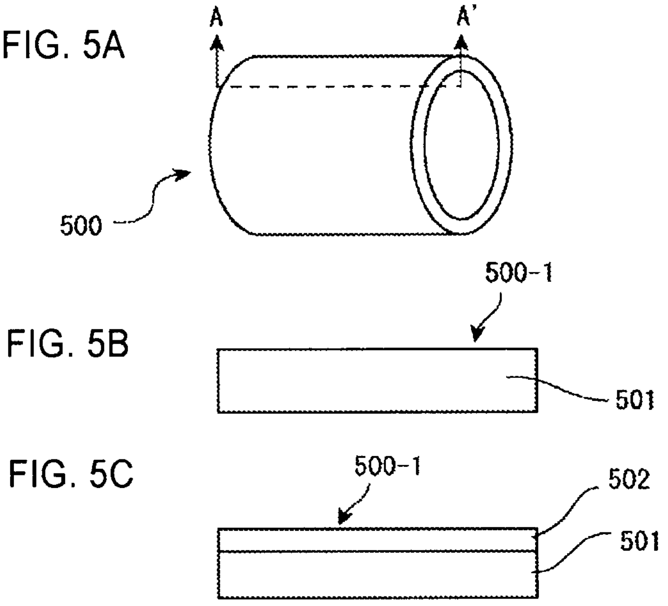
FIG. 5A is a perspective view of a configuration example of an electrophotographic belt according to the present disclosure.
FIGS. 5B and 5C are schematic cross-sectional views of examples taken along line A-A' in FIG. 5A.

FIG. 5A shows a perspective view of an electrophotographic belt 500 having an endless belt shape according to at least one aspect of the present disclosure. An example of the layer structure is a single-layer (monolayer) structure in which the cross section taken along line A-A' in FIG. 5A is composed of only a base layer 501, as shown in FIG. 5B. In this case, the outer surface 500-1 of the base layer becomes the toner carrying surface (outer surface) of the electrophotographic belt.

As another example, as shown in FIG. 5C, the cross section taken along line A-A' has a laminated structure including the base layer 501 and the surface layer 502 covering the outer circumferential surface of the base layer. That is, the electrophotographic belt comprises a cylindrical film as a base layer and may further comprise a surface layer. When the surface layer 502 is provided, the outer surface 500-1 of the surface layer 502 becomes the toner carrying surface of the electrophotographic belt. In both configurations shown in FIGS. 5B and 5C, the inner circumferential surface of the cylindrical film constitutes the inner circumferential surface of the electrophotographic belt.

The electrophotographic belt may comprise layers other than the base layer and the surface layer.

Base Layer

The cylindrical film constituting the base layer comprises a crystalline polyester, an amorphous polyester, and carbon black. The content ratio of the carbon black in the cylindrical film is 2.0% by mass or more. The cylindrical film has a first phase comprising the amorphous polyester and carbon black, and a second phase comprising the crystalline polyester and the (meth)acrylic resin.

The average alignment degree Fc1 of carbon black in the circumferential direction is 0.30 or more, and the average alignment angle Φc1 of carbon black in the circumferential direction is −10° to +10° as observed in a square observation area of 5 μm in length×5 μm in width in a cross section of the cylindrical film in the thickness and a direction along the circumferential direction of the cylindrical film.

By setting the average alignment degree Fc1 of carbon black in the circumferential direction to 0.30 or more and setting the average alignment angle Φc1 to −10° to +10°, an electrophotographic belt is obtained that has excellent surface peeling resistance during long-term use while maintaining high conductivity in the circumferential direction of the inner circumferential surface.

Average Alignment Degree Fc1 and Average Alignment Angle (Cl of Carbon Black

The average alignment degree Fc1 (hereinafter also simply referred to as "Fc1") of carbon black comprised in the cylindrical film in the circumferential direction of the cylindrical film, and the average alignment angle Φc1 (hereinafter simply referred to as "Φc1") of carbon black in the circumferential direction of the cylindrical film will be explained hereinbelow.

Fc1 and Φc1 are parameters representing the state of alignment and the degree of alignment of carbon black comprised in the cylindrical film in the circumferential direction of the cylindrical film, respectively. This will be explained in detail below.

In order to calculate Fc1 and Φc1, first, a measurement sample is prepared from the cylindrical film. A sample having a length of 5 mm in the circumferential direction, a length of 5 mm in a direction (axial direction) orthogonal to the circumferential direction, and a thickness equal to the total thickness of the cylindrical film is cut out from a freely selected position of the cylindrical film by using a microtome. In the cut sample, a first cross section in the thickness and a direction along the circumferential direction of the cylindrical film is polished using an ion beam. For example, a cross-section polisher can be used to polish the cross section using an ion beam. By polishing the cross section using an ion beam, it is possible to prevent carbon black from falling off from the sample and also to prevent mixing of the abrasive, and it is also possible to form a cross section with few polishing marks.

Next, the polished first cross section is observed with a scanning electron microscope (SEM), and an image (SEM image) of a square observation area of 5 μm in length×5 μm in width is acquired at a predetermined position on the first cross section. At this time, adjustment is made so that the vertical direction of the SEM image is parallel to the thickness direction of the cylindrical film, and the horizontal direction of the SEM image is parallel to the circumferential direction of the cylindrical film. The resolution is set to be sufficient to analyze the carbon black appearing in the first cross section (for example, 2000 pixels vertically by 2000 pixels horizontally).

It is preferable to stain the first cross section prior to forming the SEM image, since this can further improve the contrast of the SEM image. By using a high-contrast SEM image, the below-described binarization process can be performed more accurately. For example, ruthenium tetroxide can be suitably used for staining. Staining with ruthenium tetroxide can provide contrast between crystalline and amorphous materials. Therefore, the first phase and the second phase can be easily distinguished in the SEM image.

Next, a binarization process is performed on the obtained SEM image so that the carbon black is white and the resin part around the carbon black is black to obtain a binarized image. An example of a binarized image is shown in FIG. 6A. In FIG. 6A, the white area is the carbon black part, and the black part is the resin part. In addition, in FIG. 6A, the left-right direction is the circumferential direction of the cylindrical film, and the up-down direction is the thickness direction of the cylindrical film. In the binarization process performed to obtain a binarized image in which the carbon black part is white and the resin part (crystalline polyester, amorphous polyester, (meth)acrylic resin, etc.) is black, for example, the Otsu method described in IEEE Transactions on SYSTEMS, MAN, AND CYBERNETICS, vol. SMC-9, No. 1, January 1979, pp 62-66 can be used. Further, for the binarization process, for example, commercially available image processing software "ImageJ" (trade name, manufactured by the National Institutes of Health, USA) can be used.

Figure 7A:
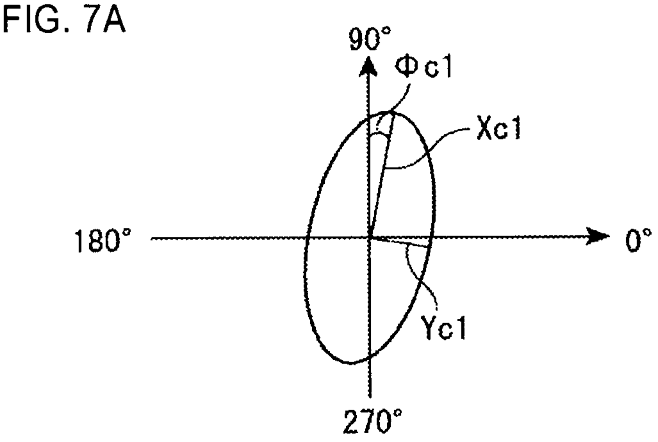
FIGS. 7A, 7B, and 7C are ellipse plot diagrams representing the direction of alignment and the degree of alignment of carbon black in the circumferential direction of the electrophotographic belt according to the present disclosure.

Next, a two-dimensional Fourier transform is performed on the obtained binarized image, and the power spectrum is integrated in the circumferential direction of the cylindrical film to obtain an ellipse plot representing the direction of alignment and the degree of alignment of carbon black in the circumferential direction (see FIG. 7A). In two-dimensional Fourier transform, a peak appears in the direction orthogonal to the periodicity of the image. Therefore, in the ellipse plot shown in FIG. 7A obtained by two-dimensional Fourier transform of the binarized image, the 90°-270° direction (vertical axis direction) indicates the circumferential direction of the cylindrical film, and the 0°-180° direction (horizontal axis direction) indicates the thickness direction of the cylindrical film. The angle φc1 (alignment angle) that the semimajor axis Xc1 of the ellipse plot makes with respect to the 90°-270° direction (vertical axis direction) is a parameter that indicates the alignment state of carbon black in the circumferential direction of the cylindrical film. Where the direction of rotation from 90° to 0° (clockwise direction) is taken as + and the direction of rotation from 90° to 180° (counterclockwise direction) is taken as −, as shown in FIG. 7C, in the ellipse plot shown in FIG. 7A, the alignment angle φc1 can take a value between −90° and +90°. The closer the value of the alignment angle φc1 is to 0, that is, the smaller the inclination with respect to the 90°-270° axis, the more strongly the carbon black is aligned in the circumferential direction of the cylindrical film.

In addition, where the semimajor axis is denoted by Xc1, the semiminor axis orthogonal to the semimajor axis is denoted by Yc1, the length of the semimajor axis Xc1 is denoted by xc1, and the length of the semiminor axis Yc1 is denoted by yc1 in the ellipse plot, the flatness of the ellipse plot found by the following formula (X) is taken as the alignment degree fc1.

$$fc1 = 1 - (yc1/xc1) \tag{X}$$

The alignment degree fc1 can take a value of 0.00 or more and less than 1.00. When the carbon black is not aligned in the circumferential direction of the cylindrical film and is completely randomly dispersed, the alignment degree fc1 is 0.00. As the degree of alignment of carbon black in the circumferential direction becomes stronger, the alignment degree fc1 approaches 1.00. That is, the alignment degree fc1 is a parameter representing the degree of alignment of carbon black in the circumferential direction.

The average alignment angle Φc1 and the average alignment degree Fc1 are the average values of the alignment angle φc1 and the alignment degree fc1 obtained from the first cross section of each of 20 samples cut out from freely selected positions of the cylindrical film to be evaluated.

The average alignment angle Φc1 is −10° to +10°, preferably −7° to +7°, and more preferably from −2° to +2°.

Furthermore, the average alignment degree Fc1 is 0.30 or more, preferably 0.40 or more, and more preferably 0.50 or more. The upper limit of the average alignment degree Fc1 is not particularly limited, and is preferably as high as possible, but may be, for example, 0.99 or less, particularly 0.80 or less, and even 0.70 or less. Therefore, the preferable range of the average alignment degree Fc1 is, for example, 0.30 to 0.99, 0.30 to 0.70, 0.40 to 0.80, and even 0.50 to 0.70.

By having the average alignment angle Φc1 and the average alignment degree Fc1 within the above ranges, high conductivity in the circumferential direction of the inner circumferential surface of the cylindrical film can be maintained.

That is, it is thought that by extending and aligning carbon black in the circumferential direction of the cylindrical film, conductive paths created by carbon black are easily formed in the circumferential direction of the cylindrical film. As a result, high conductivity in the circumferential direction of the inner circumferential surface can be demonstrated with a relatively small amount of carbon black. That is, the cylindrical film according to at least one aspect of the present disclosure has high conductivity in the circumferential direction of the inner circumferential surface.

Furthermore, as a result, the content ratio of the binder in the cylindrical film can be increased, so that the wear resistance of the inner circumferential surface can be improved.

An example of a method for adjusting the average alignment angle Φc1 and the average alignment degree Fc1 within the above ranges is a method using biaxial stretch blow molding described below, that is, a method in which the cylindrical film is made into a biaxially stretched cylindrical film.

Average Alignment Degree Fc2 and Average Alignment Angle Φc2 of Carbon Black

Figure 8B:
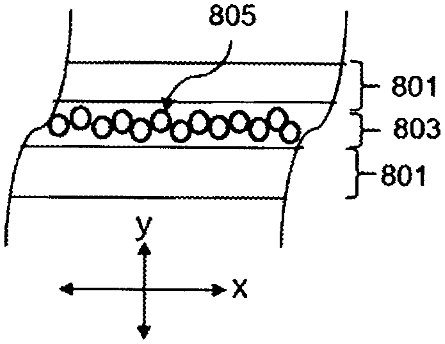
FIG. 8B is a cross-sectional view of the structure in the thickness direction of the cylindrical film and the axial direction of the cylindrical film.

Furthermore, in the cylindrical film according to at least one aspect of the present disclosure, it is preferable that carbon black in the first phase be also oriented in the axial direction of the cylindrical film. FIG. 8B is an explanatory diagram of the structure in a cross section of the cylindrical film in the thickness and the axial direction of the cylindrical film. In FIG. 8B, the x-axis indicates the axial direction of the cylindrical film, and the y-axis indicates the thickness direction of the cylindrical film. The cylindrical film has a second phase 801 comprising the crystalline polyester and the (meth)acrylic resin, and a first phase 803 comprising the amorphous polyester and carbon black 805. The carbon black 805 in the first phase 803 is oriented in the axial direction of the cylindrical film. As a result, high conductivity in the axial direction of the inner circumferential surface can be demonstrated with a relatively small amount of carbon black. The degree of orientation of carbon black in the axial direction of the cylindrical film can be determined as follows.

The average alignment degree Fc2 of carbon black in the axial direction of the cylindrical film as observed in a square observation area of 5 μm in length×5 μm in width in a cross section of the cylindrical film in the thickness and a direction along the axial direction of the cylindrical film is preferably 0.30 or more, and the average alignment angle Φc2 of carbon black in the axial direction of the cylindrical film in the same observation is preferably −10° to +10°.

By satisfying these requirements, the conductivity in the axial direction of the inner circumferential surface of the cylindrical film can be made even more uniform.

A method for calculating Fc2 and Φc2 is the same as the method for calculating Fc1 and Φc1, except that the observed cross section of the sample is set from the first cross section to the second cross section in the thickness and the direction along the axial direction of the cylindrical film. When obtaining the SEM image from the second cross section, adjustment is made so that the vertical direction of the SEM image is parallel to the thickness direction of the cylindrical film, and the horizontal direction of the SEM image is parallel to the axial direction of the cylindrical film. Then, a binarized image is created from the SEM image, which has been acquired from the second cross section, in the same manner as in the above-described method of calculating Fc1 and Φc1.

Figure 6B:
FIG. 6B is a binarized image of the SEM image of the cylindrical film in a cross section of the cylindrical film in the thickness and a direction along the axial direction of the cylindrical film.

An example of a binarized image is shown in FIG. 6B. In FIG. 6B, the left-right direction is the axial direction of the cylindrical film, and the up-down direction is the thickness direction of the cylindrical film. Next, a two-dimensional Fourier transform is performed on the obtained binarized image in the same manner as in the method of calculating Fc1 and Φc1 to obtain an ellipse plot.

Figure 7B:
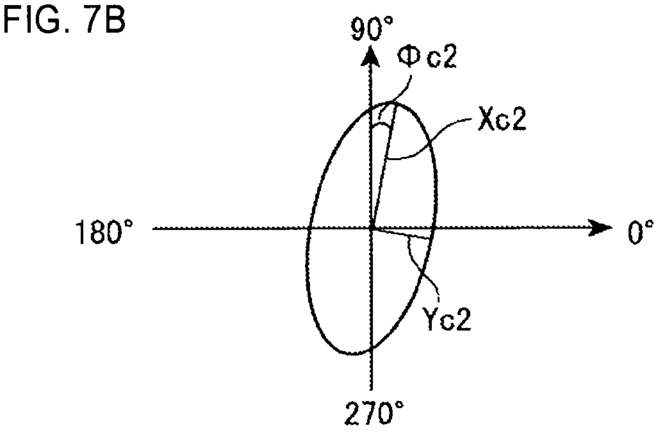
Figure 7C:
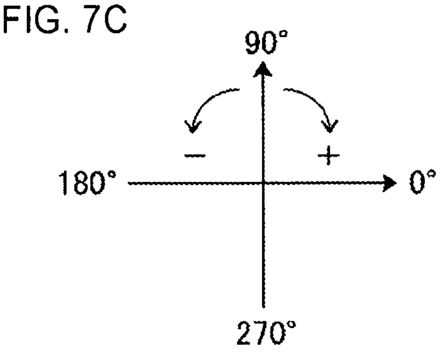

An example of ellipse plot is shown in FIG. 7B. In the ellipse plot shown in FIG. 7B, the 90°-270° direction (vertical axis direction) indicates the axial direction of the cylindrical film, and the 0°-180° direction (horizontal axis direction) indicates the thickness direction of the cylindrical film. The angle φc2 (alignment angle) that the semimajor axis Xc2 of the ellipse plot makes with respect to the 90°-270° direction is a parameter that indicates the alignment state of carbon black in the axial direction of the cylindrical film. Where the direction of rotation from 900 to 0° (clockwise direction) is taken as + and the direction of rotation from 900 to 1800 is (counterclockwise direction) taken as −, as shown in FIG. 7C, in the ellipse plot shown in FIG. 7B, the alignment angle φc2 can take a value of −90° to +90°. The closer the value of the alignment angle φc2 is to 0, that is, the smaller the inclination with respect to the 90°-2700 axis, the more strongly the carbon black is aligned in the axial direction of the cylindrical film.

In addition, where the semimajor axis is denoted by Xc2, the semiminor axis orthogonal to the semimajor axis is denoted by Yc2, the length of the semimajor axis Xc2 is denoted by xc2, and the length of the semiminor axis Yc2 is denoted by yc2 in the ellipse plot, the flatness of the ellipse plot found by the following formula (Y) is taken as the alignment degree fc2.

$$fc2 = 1 - (yc2/xc2) \tag{Y}$$

The alignment degree fc2 can take a value of 0.00 or more and less than 1.00. When the carbon black is not aligned in the axial direction of the cylindrical film and is completely randomly dispersed, the alignment degree fc2 is 0.00. As the degree of alignment of carbon black in the axial direction becomes stronger, the alignment degree fc2 approaches 1.00. That is, the alignment degree fc2 is a parameter representing the degree of alignment of carbon black in the axial direction. The average alignment angle Φc2 and the average alignment degree Fc2 according to the present disclosure are the average values of the alignment angle φc2 and the alignment degree fc2 obtained from the second cross section of each of 20 samples cut out from freely selected positions of the cylindrical film to be evaluated.

The average alignment angle Φc2 is −10° to +10°, preferably −7° to +7°, and more preferably −2° to +2°.

Furthermore, the average alignment degree Fc2 is 0.30 or more, preferably 0.40 or more, and more preferably 0.50 or more. The upper limit of the average alignment degree Fc2 is not particularly limited, and is preferably as high as possible, but may be, for example, 0.99 or less, particularly 0.80 or less, and even 0.70 or less. Therefore, the preferable range of the average alignment degree Fc2 is, for example, 0.30 to 0.99, 0.30 to 0.70, 0.40 to 0.80, and even 0.50 to 0.70.

As mentioned hereinabove, by having the average alignment angle Φc2 and the average alignment degree Fc2 within the above ranges, the conductivity in the axial direction of the inner circumferential surface can be made more uniform.

That is, it is thought that by extending and aligning carbon black in the axial direction of the cylindrical film, conductive paths created by carbon black are easily formed in the axial direction of the cylindrical film. As a result, the conductivity in the axial direction of the inner circumferential surface can be demonstrated with a relatively small amount of carbon black. That is, as a result of setting the average alignment angle Φc2 and the average alignment degree Fc2 within the above-described ranges, the cylindrical film has uniform and high conductivity in the axial direction of the inner circumferential surface.

Furthermore, as a result, the content ratio of the binder in the cylindrical film can be increased, so that the wear resistance of the inner circumferential surface can be improved.

An example of a method for adjusting the average alignment angle Φc2 and the average alignment degree Fc2 within the above ranges is a method using biaxial stretch blow molding described below. That is, the cylindrical film may be a biaxially stretched cylindrical film.

The cylindrical film can be a cylindrical film (hereinafter also referred to as a "biaxially stretched cylindrical film") obtained by stretching a preform, which is a molded product having a test tube shape and made of a resin mixture, in two directions: the axial (longitudinal) direction and the circumferential direction of the preform. That is, the cylindrical film is preferably a biaxially stretched cylindrical film. The axial direction of the preform refers to the up-down direction of the preform 205 in, for example, FIG. 3A.

Here, as the resin mixture, a resin mixture comprising a crystalline polyester, an amorphous polyester, a (meth) acrylic resin, and carbon black can be used.

The biaxially stretched cylindrical film can be produced, for example, through the following steps (i) to (iii).

Step (i): A preform having a test tube shape is molded using a resin mixture comprising a crystalline polyester, an amorphous polyester, a (meth)acrylic resin, and carbon black.

Step (ii): The obtained preform is stretched in the axial direction of the preform using a stretching rod and also in the circumferential direction by introducing gas into the preform, thereby obtaining a bottle-shaped molded product (hereinafter also referred to as a "blow bottle") that is biaxially stretched in the axial direction and circumferential direction (biaxial stretch blow molding).

Step (iii): Both ends of the obtained blow bottle are cut off to obtain an endless cylindrical film.

Although the specific means of step (i) is not particularly limited, examples include the following means.

First, the amorphous polyester and carbon black are melt-kneaded to prepare an amorphous polyester mixture. Next, it is preferable to mix the obtained amorphous polyester mixture with the crystalline polyester and the (meth) acrylic resin, and further melt-knead the mixture to prepare a resin mixture to be used for forming a preform. At this time, the crystalline polyester mixture may be prepared in advance by melt-kneading the crystalline polyester and the (meth)acrylic resin, and the resin mixture to be used for forming the preform may be prepared by melt-kneading the amorphous polyester mixture and the crystalline polyester mixture. With the method in which the amorphous polyester mixture prepared in advance is melt-kneaded with the crystalline polyester or crystalline polyester mixture, as described above, a resin mixture can be easily obtained that has a phase-separated structure in which the second phase comprising the crystalline polyester and the (meth)acrylic resin and the first phase comprising the amorphous polyester and carbon black are present. When using two or more types of crystalline polyesters as the crystalline polyester, it is preferable to melt and knead the two or more types of crystalline polyesters to prepare a crystalline polyester mixture.

When the amorphous polyester mixture is hot-melted and kneaded with the crystalline polyester and (meth)acrylic resin mixture, the kneading is preferably carried out at the following temperature. That is, it is preferable to knead at a temperature at or above the highest melting point among the melting points of the crystalline polyester, (meth)acrylic resin, and amorphous polyester, which constitute the resin mixture, so that the resin with the highest melting point could be well kneaded.

The kneading method is not particularly limited, and a single-screw extruder, twin-screw kneading extruder, Banbury mixer, rolls, Brabender, Plastograph, kneader, and the like can be used.

A test tube-shaped preform is molded using the resin mixture thus obtained. The method for molding the preform is not particularly limited and can be exemplified by the following method.

Figure 2:
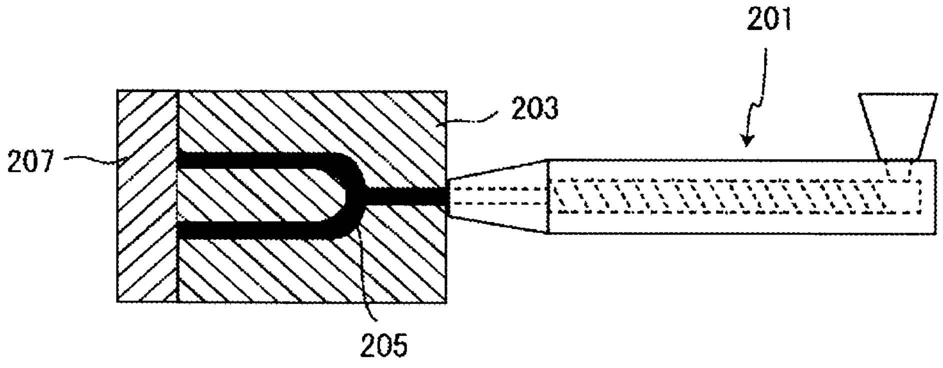
FIG. 2 is a schematic cross-sectional view of an injection molding device used in Examples.

As shown in FIG. 2, the molten resin mixture is injected using an injection molding device 201 into a mold for preform molding that consists of a cavity mold 203 and a core mold 207, and then solidified in the mold for preform molding to mold the preform 205.

At this time, the temperature of the mold for preform molding into which the molten material is injected is preferably kept at, for example, 40° C. or lower. The molten material injected into the mold is cooled and solidified within the mold, but by quickly cooling the molten material, the crystallization of the crystalline polyester can be prevented from progressing.

By suppressing the crystallization of the crystalline polyester within the preform, it is possible to more accurately control the crystal orientation of the crystalline polyester in the biaxial directions in the biaxial stretch blow molding of step (ii). In the preform formed through such a process, a phase comprising carbon black and amorphous polyester (hereinafter also referred to as "CB-containing amorphous PES phase") is present while extending in a layered manner in the axial direction of the preform in the phase comprising the crystalline polyester and (meth)acrylic resin.

Figure 3A:
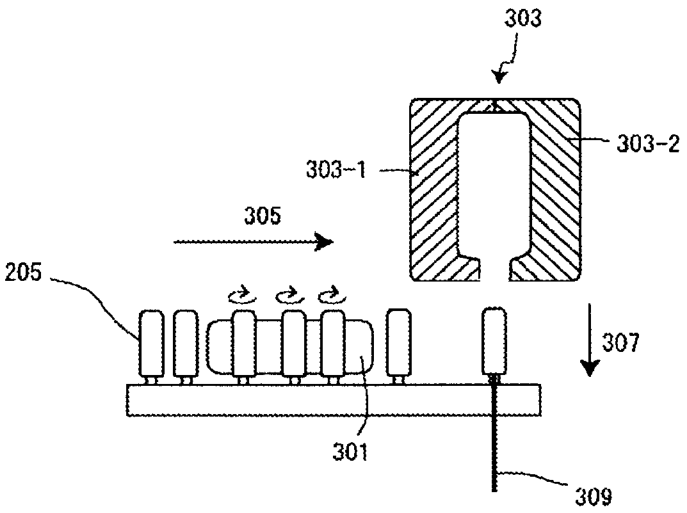
FIGS. 3A, 3B, 3C, and 3D are schematic cross-sectional views of a primary blow molding device used in Examples.

Next, in step (ii), the preform is subjected to biaxial stretch blow molding. First, as shown in FIG. 3A, the preform 205 is placed in a heating device 301 and heated to a temperature at which the preform can be stretched. The temperature at which the film can be stretched is, for example, 100° C. to 160° C.

The heating time at this time is preferably within 5 min, more preferably within 1 min. By setting the heating time to 5 min or less, it is possible to prevent the crystallization of the crystalline polyester from progressing within the preform during heating.

Figure 3B:
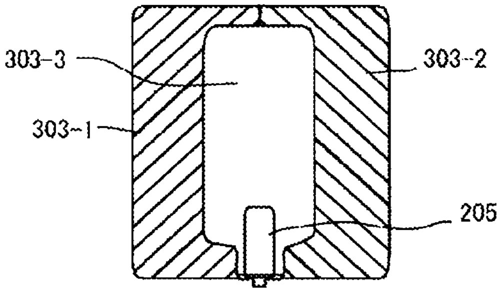

The heated preform is transported in the direction of arrow 305. Next, a blow mold 303 in which a cylindrical cavity 303-3 is formed by assembling a left mold 303-1 and a right mold 303-2 is lowered in the direction of arrow 307 from directly above the heated preform 205. Then, as shown in FIG. 3B, the preform is arranged in the mouth of the blow mold 303.

The heated preform is preferably placed in the mouth of the blow mold within a short time (for example, within 20 sec) so that the temperature of the heated preform does not drop before the start of the next biaxial stretching step. Thereby, progress of crystallization of the crystalline polyester within the preform due to gradual cooling of the preform can be prevented.

The heating temperature of the preform in the heating device is not particularly limited as long as the preform can be stretched. For example, the heating temperature may be calculated in advance by looking at the endothermic peak or the shift of the baseline when the temperature is increased by using a differential scanning calorimeter (DSC) or may be determined from the glass transition temperature (Tg) for the resin mixture, which is the constituent material of the preform.

Figure 3C:
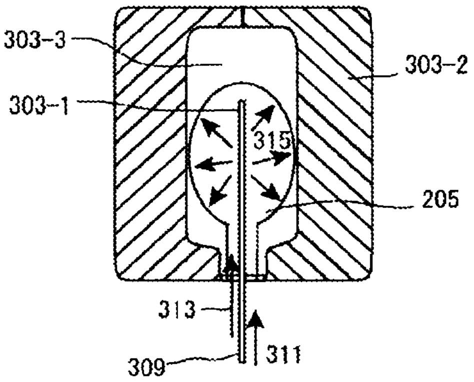

Subsequently, the heated preform 205 arranged in the blow mold 303 is stretched in the axial direction of the preform 205 by driving the stretching rod 309 in the direction of arrow 311, as shown in FIG. 3C. This stretching is called primary stretching.

Additionally, gas is allowed to flow into the preform from the mouth of the preform 205 (arrow 313) to expand the preform in circumferential direction thereof. This is called secondary stretching. Examples of the gas to be blown include air, nitrogen, carbon dioxide, argon, and the like. As a result, the preform 205 expands in each direction shown by arrow 315 in FIG. 3C, comes into close contact with the inner wall of the cavity 303-3, and is cooled and solidified in that state.

The secondary stretching may be performed following the primary stretching, but it is preferable that the driving of the stretching rod in the primary stretching step and the inflow of gas into the preform may be synchronized to perform the primary stretching and the secondary stretching substantially simultaneously.

Next, the blow bottle is taken out from the blow mold 303 by separating the left mold 303-1 and the right mold 303-2 of the blow mold 303.

Through these biaxial stretching and molding steps, the CB-containing amorphous PES phase extending in the axial direction of the preform is further extended by stretching in the axial direction of the preform. Further, by stretching the preform in the circumferential direction, the CB-containing amorphous PES phase is also extended in the circumferential direction of the preform. That is, in the blow bottle, a disc-shaped CB-containing amorphous PES phase (first phase) extending in the circumferential and axial directions of the blow bottle is mixed with a phase (second phase) comprising the crystalline polyester and (meth)acrylic resin.

Figure 3D:
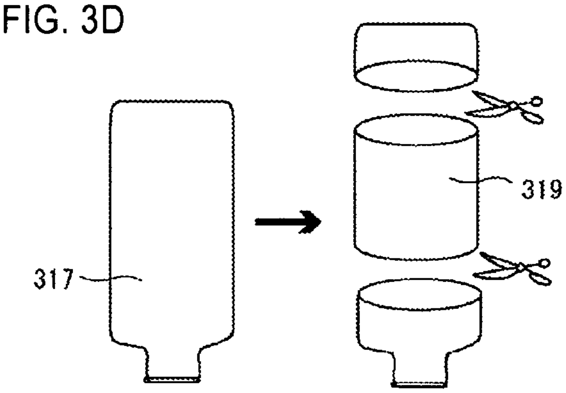

Next, as shown in FIG. 3D, the mouth side portion of the obtained blow bottle 317 and the upper end portion on the opposite side from the mouth side are cut off to form a biaxially stretched cylindrical film 319 that will serve as the base layer.

Before cutting the blow bottle 317, heat treatment may be performed, as necessary, to adjust the surface roughness of the outer circumferential surface of the blow bottle, finely adjust the crystallinity of the crystalline polyester, and the like.

Figure 4A:
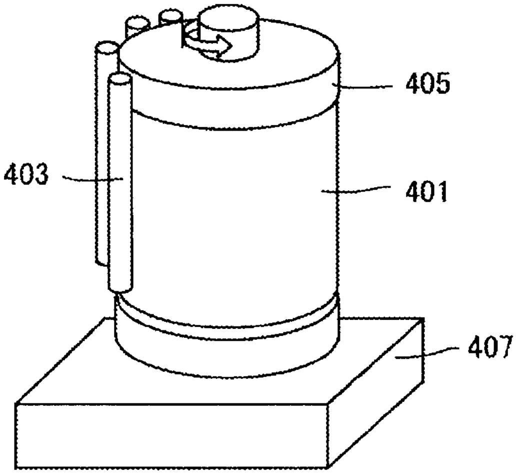
FIGS. 4A and 4B are a perspective view and a schematic cross-sectional view of a secondary blow molding device used in Examples.
Figure 4B:
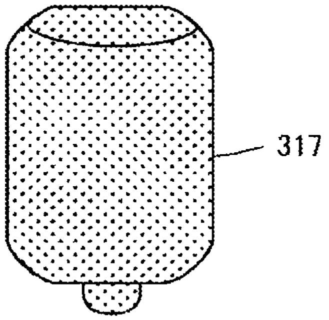

Specifically, for example, as shown in FIGS. 4A and 4B, the blow bottle 317 is placed in a cylindrical mold 401, then an outer mold 405 is mounted, and the blow bottle is filled with gas. In order to prevent the gas inside the blow bottle from leaking, outer molds are mounted on the upper part and lower part of the mold 401. The mold obtained is placed on a rotary table 407 and heated, while rotating the mold 401, with a roller-shaped heater 403 brought into contact with the outer circumferential surface of the mold 401. The heating temperature may be, for example, 130° C. to 190° C., and the heating time may be, for example, such that the entire circumference of the blow bottle is uniformly heated for about 60 sec.

In this way, a biaxially stretched cylindrical film can be obtained in which carbon black is aligned in the circumferential direction and the axial direction, the Fc1 and Φc1 are satisfied, and the Fc2 and Φc2 are also satisfied.

Here, the technical significance of using the crystalline polyester and amorphous polyester is as follows.

Where carbon black is dispersed in the crystalline thermoplastic resin, carbon black acts as crystal nuclei of the crystalline thermoplastic resin. Therefore, when a preform in which carbon black is dispersed in the crystalline thermoplastic resin is stretched, carbon black serves as crystal nuclei, spherulites of the crystalline thermoplastic resin rapidly grow, and the preform hardens following the crystal growth. Therefore, the preform is likely to break during the stretching process.

However, by using the crystalline polyester and amorphous polyester, carbon black can be unevenly distributed to the amorphous polyester phase.

Since carbon black in the amorphous polyester phase is less likely to come into direct contact with the crystalline polyester, crystallization of the crystalline polyester in the stretching step is suppressed. Meanwhile, although the amorphous polyester is incompatible with the crystalline polyester, the amorphous polyester has ester bonds similarly to the crystalline polyester and, therefore, has a relatively high affinity with the crystalline polyester. Therefore, during the stretching process, breakage at the interface between the amorphous polyester phase and the crystalline polyester phase is less likely to occur.

In the stretching step, the amorphous polyester phase is extended while containing carbon black. Therefore, it is considered that conductive paths of carbon black are formed in the amorphous polyester phase within the cylindrical film obtained by stretching. This is conceivably why high conductivity can be achieved.

Furthermore, when the crystalline polyester is extended in the axial direction and the circumferential direction of the preform, the crystals are oriented in each direction, and the polyester has excellent strength.

It is preferable that the tensile modulus Ep of the cylindrical film in the circumferential direction and the tensile modulus Ea of the cylindrical film in the axial direction be 1000 MPa or more.

Ep is more preferably 1100 MPa or more, and even more preferably 1200 MPa or more. The upper limit of Ep is not particularly limited, and can be exemplified by 2000 MPa or less, 1800 MPa or less, and 1600 MPa or less. That is, Ep is preferably 1000 MPa to 2000 MPa, 1100 MPa to 1800 MPa, and 1200 MPa to 1600 MPa.

Ea is more preferably 1100 MPa or more, and even more preferably 1200 MPa or more. The upper limit of Ea is not particularly limited, and can be exemplified by 2000 MPa or less, 1800 MPa or less, and 1600 MPa or less. That is, Ea is preferably 1000 MPa to 2000 MPa, 1100 MPa to 1800 MPa, and 1200 MPa to 1600 MPa.

As described above, the electrophotographic belt is tensioned by a plurality of rollers at a predetermined tension in the electrophotographic image forming apparatus, but by setting Ep to 1000 MPa or more, elongation and breakage can be easily prevented.

Furthermore, by applying a predetermined tension in the circumferential direction, a compressive force is applied in a direction orthogonal to the circumferential direction of the electrophotographic belt. At this time, by setting Ea to 1000 MPa or more, it becomes easier to suppress the occurrence of wrinkles along the circumferential direction on the outer surface of the electrophotographic belt due to the compressive force.

Methods for measuring Ep and Ea will be described hereinbelow.

The tensile moduli Ep and Ea described above can be controlled by adjusting the degree of orientation of the crystalline polyester in the circumferential direction of the cylindrical film and in the direction (axial direction) orthogonal to the circumferential direction, specifically, by adjusting the stretching ratio. The degree of stretching of the crystalline polyester can be expressed by a contraction rate αp of the cylindrical film in the circumferential direction and a contraction rate αa in the direction (axial direction) orthogonal to the circumferential direction.

It is preferable that the contraction rate αp of the cylindrical film in the circumferential direction and the contraction rate αa of the cylindrical film in the axial direction be 2.00% or more.

In a cylindrical film in which αp and αa are 2.00% or more, the crystalline polyester is sufficiently oriented in the circumferential direction and the axial direction of the cylindrical film. Therefore, when the belt is tensioned, contraction stress acts on the belt, making it easier to suppress deformation of the belt. The cylindrical film having such a contraction rate can have the above-mentioned tensile moduli Ep and Ea of 1000 MPa or more.

αp may be, for example, 2.00% to 6.00%, 2.00% to 5.50%, or 2.00% to 5.00%. αa may be, for example, 2.00% to 6.00%, 2.00% to 5.50%, from 2.00% to 5.00%.

Methods for measuring αp and αa will be described hereinbelow.

αp and αa can be adjusted within the above ranges, for example, by a method of adjusting the stretching ratio in the axial direction and circumferential direction of the preform in the above-described biaxial stretch blow molding.

Since conductive paths can be effectively formed by carbon black in the cylindrical film, it is possible to realize sufficient conductivity without using an ionic conductive agent. This also allows the cylindrical film to have extremely low environmental dependence of conductivity. However, an ion conductive agent may be used without departing from the spirit of the present disclosure.

Here, the surface resistivity Ap (Ω/□) in the circumferential direction of the cylindrical film that is measured on the inner circumferential surface of the cylindrical film in an environment with a temperature of 23° C. and a relative humidity of 50% is preferably $1.00\times10^{3}$ Ω/□ to $1.00\times10^{13}$ Ω/□, more preferably $1.00\times10^{5}$ Ω/□ to $1.10\times10^{12}$ Ω/□, and even more preferably $1.00\times10^{7}$ Ω/□ to $1.10\times10^{11}$ Ω/□. By setting the surface resistivity Ap in the circumferential direction of the inner circumferential surface within the above range, it becomes easier to allow an electric current to flow in the circumferential direction of the inner circumferential surface of the cylindrical film.

In addition, the ratio value (Ap/Bp) of the surface resistivity Ap to a surface resistivity Bp (Ω/□) in the circumferential direction of the cylindrical film that is measured on the inner circumferential surface of the cylindrical film that has been allowed to stand for 24 h in an environment with a temperature of 30° C. and a relative humidity of 80% is preferably 3.00 or less.

In this way, the reduction of environmental dependence of surface resistance in the cylindrical film contributes to stable formation of high-quality electrophotographic images in both a high-temperature and high-humidity environment and a low-temperature and low-humidity environment. Ap/Bp is more preferably 0.33 to 3.00, even more preferably 1.00 to 3.00, and particularly preferably 1.00 to 1.30.

The surface resistivity Bp (Ω/□) in the circumferential direction of the cylindrical film that is measured on the inner circumferential surface of the cylindrical film that has been allowed to stand for 24 h in an environment with a temperature of 30° C. and a relative humidity of 80% is preferably $1.00\times10^{3}$ Ω/□ to $1.00\times10^{13}$ Ω/□, more preferably $1.00\times10^{5}$ Ω/□ to $1.10\times10^{12}$ Ω/□, and even more preferably $1.00\times10^{7}$ Ω/□ to $1.10\times10^{11}$ Ω/□. By setting the surface resistivity Bp in the circumferential direction of the inner circumferential surface within the above range, it becomes easier to allow an electric current to flow in the circumferential direction of the inner circumferential surface of the cylindrical film even in a high-temperature and high-humidity environment.

The surface resistivity Aa (Ω/□) in the axial direction of the cylindrical film that is measured on the inner circumferential surface of the cylindrical film in an environment with a temperature of 23° C. and a relative humidity of 50% is preferably $1.00\times10^{3}$ Ω/□ to $1.00\times10^{13}$ Ω/□, more preferably $1.00\times10^{5}$ Ω/□ to $1.10\times10^{12}$ Ω/□, and even more preferably $1.00\times10^{7}$ Ω/□ to $1.10\times10^{11}$ Ω/□. By setting the surface resistivity Aa in the axial direction of the inner circumferential surface within the above range, it becomes easier to allow an electric current to flow in the axial circumferential direction of the inner circumferential surface of the cylindrical film.

In addition, the ratio value (Aa/Ba) of the surface resistivity Aa to a surface resistivity Ba (Ω/□) in the axial direction of the cylindrical film that is measured on the inner circumferential surface of the cylindrical film that has been allowed to stand for 24 h in an environment with a temperature of 30° C. and a relative humidity of 80% is preferably 3.00 or less.

In this way, the reduction of environmental dependence of surface resistance in the cylindrical film contributes to stable formation of high-quality electrophotographic images in both a high-temperature and high-humidity environment and a low-temperature and low-humidity environment. Aa/Ba is more preferably 0.33 to 3.00, even more preferably 1.00 to 3.00, and particularly preferably 1.00 to 1.30.

The surface resistivity Ba (Ω/□) in the axial direction of the cylindrical film that is measured on the inner circumferential surface of the cylindrical film that has been allowed to stand for 24 h in an environment with a temperature of 30° C. and a relative humidity of 80% is preferably $1.00\times10^{3}$ Ω/□ to $1.00\times10^{13}$ Ω/□, more preferably $1.00\times10^{5}$ Ω/□ to $1.10\times10^{12}$ Ω/□, and even more preferably $1.00\times10^{7}$ Ω/□ to $1.10\times10^{11}$ Ω/□. By setting the surface resistivity Ba in the axial direction of the inner circumferential surface within the above range, it becomes easier to allow an electric current to flow in the axial direction of the inner circumferential surface of the cylindrical film even in a high-temperature and high-humidity environment.

Methods for adjusting the Aa and Ba within the above ranges include adjusting the amount of carbon black contained in the cylindrical film and producing the cylindrical film by axial stretch blow molding.

The above surface resistivities (Ap, Aa, Bp, and Ba) in the circumferential direction and axial direction are obtained by performing measurements according to Japanese Industrial Standard (JIS) K 6911:2006, except that a 2-pin probe with two pins (diameter 2 mm) separated by 20 mm is used.

Here, when measuring the surface resistivity in the circumferential direction, the 2-pin probe is placed on the inner circumferential surface of the cylindrical film so that the direction of the straight line (line segment) connecting the two pins is parallel to the circumferential direction.

In addition, when measuring the surface resistivity in the axial direction, the 2-pin probe is placed on the inner circumferential surface of the cylindrical film so that the direction of the straight line (line segment) connecting the two pins is parallel to the axial direction.

A high resistance meter (trade name: Hiresta UP MCP-HT450 model, manufactured by Nittoseiko Analytech Co., Ltd. (former company name: Mitsubishi Chemical Analytech Co., Ltd.)) is used to measure the surface resistivity. Further, as the 2-pin probe, for example, "UA" (trade name, manufactured by Nittoseiko Analytech Co., Ltd. (former company name: Mitsubishi Chemical Analytech Co., Ltd.)) can be used.

The thickness of the cylindrical film is not particularly limited. However, in an electrophotographic image forming apparatus, an electrophotographic belt having the cylindrical film is arranged in a bent state. Therefore, from the viewpoint of ensuring flexibility, the thickness is preferably 40 μm to 500 μm, particularly preferably 50 μm to 100 μm.

Crystalline Polyester

A crystalline polyester refers to a polyester that exhibits a clear endothermic peak in differential scanning calorimetry (DSC) measurement.

A crystalline polyester can be obtained by polycondensation of a dicarboxylic acid and a diol, polycondensation of a hydroxycarboxylic acid or a lactone, or polycondensation using a plurality of such components. Other components may be used, for example, polyfunctional monomers may be used in combination. The crystalline polyester may be a homopolyester containing one type of ester bond, or a copolyester (copolymer) containing multiple types of ester bonds.

From the viewpoint of having high crystallinity and exhibiting excellent heat resistance, the crystalline polyester is preferably at least one selected from the group consisting of a polyalkylene terephthalate, a polyalkylene naphthalate, a polyalkylene isophthalate, and copolymers containing these, more preferably at least one selected from the group consisting of a polyalkylene terephthalate, a polyalkylene naphthalate, and copolymers containing these.

From the viewpoint of having high crystallinity and exhibiting excellent heat resistance, the number of carbon atoms in the alkylene in the polyalkylene terephthalate, polyalkylene isophthalate, and polyalkylene naphthalate is preferably 2 to 16, more preferably from 2 to 8.

More specifically, as the crystalline polyester, polyethylene terephthalate (PET), polyethylene naphthalate (PEN), polyethylene isophthalate, and copolymers containing these are preferable. These can be used alone or a combination of two or more thereof.

Although the molecular weight of the crystalline polyester is not particularly limited, for example, in the case of PET, the preferable weight-average molecular weight (Mw) is 50,000 to 80,000.

Furthermore, in the case of PEN, the preferred weight-average molecular weight is 20,000 to 80,000.

The content ratio of the crystalline polyester in the cylindrical film is preferably 50.0% by mass or more, more preferably 60.0% by mass or more with respect to the cylindrical film. The upper limit is not particularly limited, but may be 95.0% by mass or less, or 90.0% by mass or less. Preferable examples include 50.0% by mass to 95.0% by mass and 60.0% by mass to 90.0% by mass.

By having the content ratio of the crystalline polyester within the above range, a sufficient amount of crystalline polyester can be oriented in the circumferential direction and axial direction of the cylindrical film, and the mechanical strength of the cylindrical film can be more reliably increased.

The content ratio of the crystalline polyester in the cylindrical film can be determined, for example, by the following method. A sample taken from a cylindrical film (for example, 1 mm square×total thickness of the cylindrical film) is immersed in methyl ethyl ketone at a temperature of 23° C. to separate the soluble matter (amorphous polyester) and insoluble matter (crystalline polyester, (meth)acrylic resin, carbon black, and the like). Next, the obtained insoluble matter is immersed in hexafluoroisopropanol (HFIP) at a temperature of 25° C., and the crystalline polyester is dissolved in HFIP and separated from the insoluble matter ((meth)acrylic resin, carbon black). HFIP is removed from the obtained HFIP solution of crystalline polyester, and the crystalline polyester as a residue is weighed.

Further, by subjecting the crystalline polyester obtained by the above method to differential scanning calorimetry (DSC), pyrolysis GC/MS, IR, NMR, and elemental analysis, chemical structure thereof etc. can be determined.

Amorphous Polyester

An amorphous polyester refers to a polyester that does not show a clear endothermic peak in differential scanning calorimetry (DSC) measurement.

The amorphous polyester is not particularly limited, but can be exemplified by a polyester having a structure corresponding to at least one phthalic acid selected from the group consisting of terephthalic acid, orthophthalic acid, and isophthalic acid, and a structure corresponding to at least two diols selected from the group consisting of ethylene glycol, diethylene glycol, propylene glycol, neopentyl glycol, and cyclohexanedimethanol.

Here, "the structure corresponding to A" refers to the reacted form of the monomer substance A in the polymer. The same applies hereinafter in the present disclosure.

For example, a polycondensate of a copolymer having a structure derived from ethylene terephthalate and a structure derived from ethylene orthophthalate and the above diols, and a polycondensate of a copolymer having a structure derived from ethylene terephthalate and a structure derived from ethylene isophthalate and the above diols can be mentioned.

These copolymers may be block copolymers or random copolymers. Further, the amorphous polyester may be used as a polymer alloy in which two or more amorphous polyesters are blended.

Examples of amorphous polyesters that can be suitably used include amorphous polyesters having a structure corresponding to terephthalic acid and a structure corresponding to ethylene glycol and propylene glycol. Such amorphous polyesters are commercially available, for example, as "Vylon GK640" and "Vylon GK880" (both trade names, manufactured by Toyobo Co., Ltd.).

Although the molecular weight of the amorphous polyester is not particularly limited, for example, the weight-average molecular weight (Mw) is preferably 8000 to 60,000, more preferably 10,000 to 40,000.

The content of the amorphous polyester is preferably 100.0 parts by mass or less, when the total content of the crystalline polyester and (meth)acrylic resin is 100.0 parts by mass. Further, the content of the amorphous polyester is preferably 10.0 parts by mass to 100.0 parts by mass, and more preferably 15.0 parts by mass to 65.0 parts by mass.

By setting the content of the amorphous polyester related to the total content of the crystalline polyester and (meth) acrylic resin within the above range, an amorphous polyester phase (first phase) enclosing conductive paths of carbon black can be easily formed in the cylindrical film, making it easier to satisfy the above-mentioned surface resistivity.

The content ratio of the amorphous polyester in the cylindrical film can be determined, for example, by the following method. A sample taken from a cylindrical film (for example, 1 mm squarextotal thickness of the cylindrical film) is immersed in methyl ethyl ketone (MEK) at a temperature of 23° C. to separate the soluble matter (amorphous polyester) and insoluble matter (crystalline polyester, carbon black, and the like). Then, MEK is removed from the obtained MEK solution of the amorphous polyester, and the amorphous polyester as a residue is weighed.

Further, by subjecting the amorphous polyester obtained by the above method to differential scanning calorimetry (DSC), pyrolysis GC/MS, IR, NMR, and elemental analysis, chemical structure thereof etc. can be determined.

(Meth)Acrylic Resin

A (meth)acrylic resin has a structure represented by the following formula (a). Since the cylindrical film comprises the (meth)acrylic resin having a structure represented by the following formula (a), the affinity between the crystalline polyester and carbon black is improved through the (meth) acrylic resin having a highly polar functional group, so the peeling resistance of the surface can be improved.

(a)

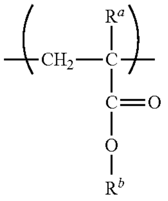

In formula (a), $R^a$ represents a hydrogen atom or a methyl group (preferably a hydrogen atom), and $R^b$ represents an alkyl group having 1 to 8 (preferably 1 to 7, more preferably 1 to 6, and still more preferably 1 to 4) carbon atoms.

Such (meth)acrylic resin can be exemplified by a (meth) acrylic resin having a structure corresponding to at least one monomer selected from the group consisting of acrylate, methacrylate, methyl acrylate, methyl methacrylate, ethyl acrylate, ethyl methacrylate, butyl acrylate, butyl methacrylate, 2-ethylhexyl acrylate, and 2-ethylhexyl methacrylate.

Where $R^a$ is a hydrogen atom, the softening properties of the (meth)acrylic resin improve and it becomes easier to mix with the crystalline polyester. It is considered that, as a result, the acrylic part is likely to come into contact with the amorphous polyester phase comprising carbon black, resulting in improved peeling resistance.

The (meth)acrylic resin may be used as a polymer alloy, which is a blend of two or more (meth)acrylic resins.

Moreover, it is more preferable that the (meth)acrylic resin has a structure represented by the following formula (a1) and a structure represented by the following formula (a2).

(a1)

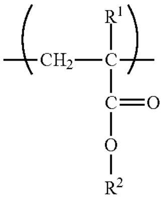

$R^1$ represents a hydrogen atom, and $R^2$ represents an alkyl group having 1 to 8 carbon atoms. $R^2$ is preferably an alkyl group having 1 to 7 carbon atoms, more preferably 1 to 6 carbon atoms, and still more preferably 1 to 4 carbon atoms.

(a2)

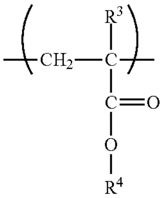

$R^3$ represents a methyl group, and $R^4$ represents an alkyl group having from 1 to 8 carbon atoms. $R^4$ is preferably an alkyl group having 1 to 7 carbon atoms, more preferably 1 to 6 carbon atoms, and still more preferably 1 to 4 carbon atoms.

Since the (meth)acrylic resin is a copolymer having the structures represented by formulas (a1) and (a2), the polarity of the (meth)acrylic resin can be easily controlled, and the affinity with the crystalline polyester and carbon black can be easily controlled. As a result, the adhesion of the interface between the first phase and the second phase can be further increased, so that the peeling resistance of the surface can be further improved.

Such (meth)acrylic resin can be exemplified by a (meth) acrylic resin having a structure corresponding to at least two monomers selected from the group consisting of acrylate, methacrylate, methyl acrylate, methyl methacrylate, ethyl acrylate, ethyl methacrylate, butyl acrylate, butyl methacrylate, 2-ethylhexyl acrylate, and 2-ethylhexyl methacrylate.

The weight-average molecular weight (Mw) of the (meth) acrylic resin is not particularly limited, but is preferably 5000 to 200,000, more preferably 10,000 to 100,000.

Where the weight-average molecular weight of the (meth) acrylic resin is within the above range, it is easy to obtain a cylindrical film with increased strength, and furthermore, the affinity with the crystalline polyester, amorphous polyester, and carbon black increases, so that the peeling resistance is likely to improve.

Examples of the (meth)acrylic block copolymer having the structures represented by formula (a1) and formula (a2) above include "KURARITY" (trade name, manufactured by Kuraray Co., Ltd.), which are block copolymers of methyl methacrylate and butyl acrylate/2-ethylhexyl acrylate. Among these, those commercially available as "KURARITY LA4285" and "KURARITY LK9243" (both are trade names, manufactured by Kuraray Co., Ltd.) can be suitably used. "KURARITY LA4285" is a (meth)acrylic block copolymer in which $R^1$ in the above formula (a1) is hydrogen, $R^2$ is a butyl group, $R^3$ in the above formula (a2) is a methyl group, $R^4$ is a methyl group, and the weight-average molecular weight is 10,000 to 100,000. In addition, "KURARITY LK9243" (both are trade names, manufactured by Kuraray Co., Ltd.) is a commercially available (meth)acrylic block copolymer in which $R^1$ in the above formula (a1) is hydrogen, $R^2$ is a 2-ethylhexyl group, $R^3$ in the above formula (a2) is a methyl group, $R^4$ is a methyl group, and the weight-average molecular weight is 10,000 to 100,000.

The content of the (meth)acrylic resin is preferably 1.0 part by mass to 30.0 parts by mass, and more preferably 2.0 parts by mass to 20.0 parts by mass, when the content of the crystalline polyester is 100.0 parts by mass. By setting the content of the (meth)acrylic resin to the crystalline polyester within the above range, the affinity between the crystalline polyester and carbon black can be easily improved as described above, and the peeling resistance of the surface of the cylindrical film can be easily improved.

The content ratio of the (meth)acrylic resin in the cylindrical film can be determined, for example, by the following method. A sample taken from a cylindrical film (for example, 1 mm square×total thickness of the cylindrical film) is immersed in methyl ethyl ketone at a temperature of 23° C. to separate the soluble matter (amorphous polyester) and insoluble matter (crystalline polyester, (meth)acrylic resin, carbon black, etc.). Next, the obtained insoluble matter is immersed in hexafluoroisopropanol (HFIP) at a temperature of 25° C., the crystalline polyester is dissolved in HFIP, and the insoluble matter ((meth)acrylic resin, carbon black) is separated. The obtained insoluble matter is immersed in an acrylic dissolving agent to separate it into a soluble matter ((meth)acrylic resin) and an insoluble matter (carbon black). The solvent is removed from the obtained (meth)acrylic resin solution, and the (meth)acrylic resin as a residue is weighed. Furthermore, by subjecting the (meth) acrylic resin obtained by the above method to differential scanning calorimetry (DSC), pyrolysis GC/MS, IR, NMR, and elemental analysis, chemical structure thereof etc. can be determined. Examples of the (meth)acrylic resin dissolving agent include "e-Solve 21RA-1" (trade name, manufactured by Kaneko Chemical Co., Ltd.).

Carbon Black

Although carbon black is not particularly limited, for example, acetylene black, furnace black, channel black, thermal black, Ketjen black (registered trademark), and the like can be used. These can be used alone or in combination of two or more.

From the viewpoint of imparting a predetermined conductivity to the base layer, the content ratio of the carbon black in the cylindrical film is 2.0% by mass or more based on the mass of the cylindrical film. Further, the content ratio of the carbon black is preferably 4.0% by mass or more, and more preferably 6.0% by mass or more. From the viewpoint of the strength of the cylindrical film, the upper limit is preferably 15.0% by mass or less, preferably 12.0% by mass or less, and more preferably 10.0% by mass or less. The preferred content ratio is, for example, 2.0% by weight to 15.0% by weight, 4.0% by weight to 12.0% by weight, and 6.0% by weight to 10.0% by weight. Further, the content of the carbon black is preferably within the range of 8.0 parts by mass to 65.0 parts by mass, when the content of the amorphous polyester in the cylindrical film is 100.0 parts by mass. By setting the proportion of the carbon black to the mass of the amorphous polyester within the above range, it becomes easier to form conductive paths by carbon black in the phase (first phase) of the amorphous polyester, and the surface resistance of the cylindrical film can be easily adjusted within the above range. The content ratio of the carbon black in the cylindrical film can be determined, for example, by weighing the insoluble matter obtained by separating the soluble matter and insoluble matter in the acrylic dissolving agent. Another method is to heat a sample taken from the cylindrical film at a high temperature under an inert gas atmosphere until a constant weight is reached, thereby ashing the resin component in the sample.

Elastomer

The cylindrical film may contain an elastomer. As the elastomer, for example, a thermoplastic elastomer can be used. Additionally, the elastomer may be a non-conductive elastomer. Examples of thermoplastic elastomers include, but are not particularly limited to, known thermoplastic elastomers such as polystyrene elastomers, polyolefin elastomers, polybutadiene elastomers, styrene butadiene elastomers, polyamide elastomers, polyurethane elastomers, polyester elastomers, and modified products thereof. Among these thermoplastic elastomers, styrene-butadiene elastomers are preferred. When the cylindrical film contains the above-described elastomer, carbon black can be more highly oriented in the circumferential direction and the axial direction in the cylindrical film. The content ratio of the elastomer in the cylindrical film is not particularly limited but is preferably 2% by mass to 15% by mass, more preferably 4% by mass to 12% by mass.

Additives

Other components may be added to the cylindrical film as additives within the ranges in which the effects of the present disclosure are not impaired. Examples of other components include antioxidants, ultraviolet absorbers, organic pigments, inorganic pigments, pH adjusters, crosslinking agents, compatibilizers, release agents, coupling agents, lubricants, and the like. These additives may be used alone or in combination of two or more.

The amount of the additive used can be set appropriately and is not particularly limited.

Further, the cylindrical film may comprise an ion conductive agent within a range such that one of the effects achieved by the configuration according to one aspect of the present disclosure, such as the effect of suppressing changes in surface resistance due to the environment, is not impaired. For example, when the cylindrical film contains an ion conductive agent, the content ratio of the ion conductive agent is preferably 2.0% by mass or less based on the mass of the cylindrical film. By setting the content ratio of the ion conductive agent to 2.0% by mass or less, the environmental dependence of the surface resistance of the cylindrical film can be made almost negligible. However, in the present disclosure, it is more preferable that the cylindrical film does not comprise an ion conductive agent. Therefore, the content ratio of the ion conductive agent in the cylindrical film is preferably 0.0% by mass to 2.0% by mass, more preferably 0.0% by mass to 0.5% by mass.

Surface Layer

The surface layer included in the electrophotographic belt having the configuration shown in FIG. 5C is not particularly limited, but examples thereof include surface layers having excellent wear resistance and containing a cured product of active energy ray-curable resin. Such a surface layer can be provided, for example, by applying a composition containing an active energy ray-curable resin such as a photocurable resin onto the outer circumferential surface of the base layer, and curing the composition by irradiation with ultraviolet rays or the like.

The thickness of the surface layer is not particularly limited, but is preferably, for example, 1 μm to 5 μm.

The photocurable resin is not particularly limited as long as it is a resin having a photocurable functional group in the molecule, and examples thereof include resins including a vinyl group, a propenyl group, an allyl group, a styryl group, an acryloyl group, a methacryloyl group, a maleimide group, and the like. Further, the photocurable resin is preferably a polyfunctional photocurable resin, such as glycerin di(meth) acrylate, trimethylolpropane di(meth)acrylate, pentaerythritol tri(meth)acrylate, diglycerin tri(meth)acrylate, sorbitan tri(meth)acrylate, dipentaerythritol penta(meth)acrylate, dipentaerythritol penta and hexa(meth)acrylate, tetraglycerin penta(meth)acrylate, and the like. Among them, dipentaerythritol penta- and hexa(meth)acrylates are preferred, and dipentaerythritol penta- and hexaacrylates are more preferred.

It is preferable that the composition containing an active energy ray-curable resin such as a photocurable resin include a photopolymerization initiator. The photopolymerization initiator is not particularly limited, and examples thereof include sulfonic acid compounds, diazomethane compounds, sulfonium salt compounds, iodonium salt compounds, disulfone-based compounds, benzophenone compounds, alkylphenone compounds, and the like. Among these, aminoalkylphenone compounds are preferable as the alkylphenone compounds, specific examples thereof being 2-methyl-1-[4-(methylthio)phenyl]-2-morpholinopropan-1-one (for example, Irgacure 907, manufactured by BASF).

An example of the use of the electrophotographic belt according to the present disclosure is an intermediate transfer belt. However, the invention is not limited to this, and can also be applied to, for example, a transport belt that carries and transports a recording medium such as paper.

Electrophotographic Image Forming Apparatus

An example of an electrophotographic image forming apparatus including an electrophotographic belt as an intermediate transfer belt according to at least one aspect of the present disclosure will be described below with reference to FIG. 1.

The electrophotographic image forming apparatus has a so-called tandem configuration in which electrophotographic stations of multiple colors are arranged side by side in the rotation direction of the intermediate transfer belt (FIG. 1). In the following explanation, the suffixes Y, M, C, and k are attached to the symbols of the configurations of yellow, magenta, cyan, and black colors, respectively, but the suffixes are in some cases omitted for similar configurations.

In FIG. 1, charging devices 2Y, 2M, 2C, and 2*k*, exposure devices 3Y, 3M, 3C, and 3*k*, developing devices 4Y, 4M, 4C, and 4*k*, and an intermediate transfer belt (intermediate transfer member) 6 are arranged around photosensitive drums (photosensitive bodies, image carriers) 1Y, 1M, 1C, and 1*k*.

The photosensitive drum 1 is rotationally driven in the direction of arrow F (counterclockwise) at a predetermined circumferential speed (process speed). The charging device 2 charges the circumferential surface of the photosensitive drum 1 to a predetermined polarity and potential (primary charging). A laser beam scanner as the exposure device 3 outputs laser light that is on/off modulated according to image information input from an external device such as an image scanner, computer, or the like (not shown), and performs scanning exposure of the charged surface of the photosensitive drum 1. Through this scanning exposure, an electrostatic latent image corresponding to the target image information is formed on the surface of the photosensitive drum 1.

The developing devices 4Y, 4M, 4C, and 4*k* each contain toner of the corresponding color component of yellow (Y), magenta (M), cyan (C), and black (k). The developing device 4 to be used is selected based on the image information, a developer (toner) is developed on the surface of the photosensitive drum 1, and the electrostatic latent image is visualized as a toner image. In this embodiment, a reversal development method is used in which toner is caused to adhere to the exposed portion of the electrostatic latent image for development. Further, such charging device, exposure device, and developing device constitute an electrophotographic image forming means.

Further, the intermediate transfer belt 6 is composed of an electrophotographic belt having an endless shape. The intermediate transfer belt 6 is tensioned around a plurality of rollers 20, 21, and 22 so that the outer circumferential surface of the belt is in contact with the surface of the photosensitive drum 1. In this embodiment, the roller 20 is a tension roller that controls the tension of the intermediate transfer belt 6 to be constant, the roller 22 is a driving roller for the intermediate transfer belt 6, and the roller 21 is an opposing roller for secondary transfer. The intermediate transfer belt 6 is rotated in the direction of arrow G by the drive of the roller 22. Furthermore, primary transfer rollers 5Y, 5M, 5C, and 5*k* are arranged at respective primary transfer positions facing the photosensitive drum 1 with the intermediate transfer belt 6 interposed therebetween.

That is, the electrophotographic image forming apparatus includes a plurality of rollers for tensioning and rotating the electrophotographic belt, and the rollers are arranged in contact with the inner circumferential surface of the electrophotographic belt.

The unfixed toner images of each color formed on the photosensitive drum 1 are sequentially electrostatically primary transferred onto the intermediate transfer belt 6 by applying a primary transfer bias having a polarity opposite to the charging polarity of the toner to the primary transfer roller 5 by using a constant voltage source or a constant current source (not shown). Then, a full-color image in which unfixed toner images of four colors are superimposed on the intermediate transfer belt 6 is obtained. The intermediate transfer belt 6 rotates while bearing the toner image transferred from the photosensitive drum 1 in this manner. After each rotation of the photosensitive drum 1 after the primary transfer, the surface of the photosensitive drum 1 is cleaned of untransferred toner by a cleaning device 11, and the image forming process is repeated.

Further, at a secondary transfer position of the intermediate transfer belt 6 facing the transport path of the recording material 7 as a transfer medium, a secondary transfer roller (transfer portion) 9 is placed in pressure contact with the toner image bearing surface side of the intermediate transfer belt 6. Further, on the back side of the intermediate transfer belt 6 at the secondary transfer position, the opposing roller 21 is provided which serves as an opposing electrode of the secondary transfer roller 9 and to which a bias is applied. When transferring the toner image on the intermediate transfer belt 6 to the recording material 7, a bias of, for example, −1000 V to −3000 V having the same polarity as that of the toner is applied to the opposing roller 21 by a secondary transfer bias applying means 28 so that a current of −10 μA to −50 μA flows. The transfer voltage at this time is detected by a transfer voltage detection means 29. Furthermore, a cleaning device (belt cleaner) 12 that removes toner remaining on the intermediate transfer belt 6 after the secondary transfer is provided downstream of the secondary transfer position.

The recording material 7 is transported in the direction of arrow H through the transport guide 8 and introduced into the secondary transfer position. The recording material 7 introduced into the secondary transfer position is transported while being nipped at the secondary transfer position, and at this time, a constant voltage bias (transfer bias) controlled to a predetermined value is applied by the secondary transfer bias applying means 28 to the opposing roller 21 of the secondary transfer roller 9. By applying a transfer bias having the same polarity as the toner to the opposing roller 21, the four-color full-color image (toner image) superimposed on the intermediate transfer belt 6 is transferred at once to the recording material 7 at the transfer site, and a full-color unfixed toner image is formed on the recording material. The recording material 7 to which the toner image has been transferred is introduced into a fixing device (not shown) and is heated and fixed.

An example of a method for measuring the weight-average molecular weight of the (meth)acrylic resin contained in the base layer of the electrophotographic belt will be described below.

Method for Separating Each Material from Base Layer (Cylindrical Film)

In order to measure the weight-average molecular weight of the (meth)acrylic resin comprised in the base layer, first, the (meth)acrylic resin is isolated from the base layer. At least one example of a method for separating the crystalline polyester, amorphous polyester, (meth)acrylic resin, and carbon black that constitute the base layer (cylindrical film) will be described hereinbelow.

The base layer pulverized into a powdered form can be separated into soluble matter (amorphous polyester) and insoluble matter (crystalline polyester, (meth)acrylic resin, carbon black, and the like) by immersion in methyl ethyl ketone at a temperature of 23° C. Further, by immersing the insoluble matter obtained above in hexafluoroisopropanol (HFIP) at a temperature of 25° C. and dissolving the crystalline polyester in HFIP, the crystalline polyester can be separated from insoluble matter ((meth)acrylic resin, carbon black). Furthermore, the insoluble matter obtained above can be separated into a soluble matter ((meth)acrylic resin) and an insoluble matter (carbon black) by immersing in a dissolving agent that can dissolve (meth)acrylic resin. As a dissolving agent for (meth)acrylic resin, for example, "e-Solve 21RA-1" (trade name, manufactured by Kaneko Chemical Co., Ltd.) can be mentioned.

Method for Measuring Weight-Average Molecular Weight (Mw) of (Meth)Acrylic Resin and the Like.

The weight-average molecular weight (Mw) of the (meth) acrylic resin isolated from the base layer by the above method can be measured, for example, by gel permeation chromatography (GPC) in the following manner.

(Meth)acrylic resin etc. is dissolved in tetrahydrofuran (THF) at room temperature (23° C.). The obtained solution is filtered through a solvent-resistant membrane filter "Maishori Disk" (manufactured by Tosoh Corporation) with a pore diameter of 0.2 μm to obtain a sample solution. The sample solution is adjusted so that the concentration of components soluble in THE is 0.8% by mass. Using this sample solution, measurements are performed under the following conditions.

GPC device: GPC gel permeation chromatography analyzer (product name: HLC-8220GPC, manufactured by Tosoh Corporation), detector: differential refractometer (product name: RI-8020, manufactured by Tosoh Corporation), and column: polystyrene gel columns (trade name: Shodex GPC LF-604, manufactured by Showa Denko K.K.) are combined.

Eluent: THF

Flow rate: 0.6 mL/min

Oven temperature: 40.0° C.

Sample injection amount: 0.020 mL

When calculating the molecular weight of the sample, a molecular weight calibration curve plotted using standard polystyrene resins (trade name: "TSK Standard Polystyrene F-850, F-450, F-288, F-128, F-80, F-40, F-20, F-10, F-4, F-2, F-1, A-5000, A-2500, A-1000, A-500", manufactured by Tosoh Corporation) is used.

Method for Measuring Glass Transition Temperature (Tg) of Test Piece or Resin Mixture The glass transition temperature Tg of the test piece used for evaluating the contraction rate or the resin mixture can be measured according to ASTM D3418-82 using, for example, a differential scanning calorimeter "Q2000" (manufactured by TA Instruments). The temperature correction of the device detection part uses the melting points of indium and zinc, and the heat of fusion of indium is used to correct the amount of heat.

Specifically, 2 mg of the sample is accurately weighed and placed in an aluminum pan. Using an empty aluminum pan as a reference, the measurement is performed at a temperature rise rate of 10° C./min within the measurement temperature range of −10° C. to 200° C. In the measurement, the temperature is raised to 200° C., then lowered to −10° C., and then raised again. A change in specific heat is obtained in the temperature range of 30° C. to 100° C. during this second temperature raising process. The intersection of the line at the midpoint of the baseline before and after the specific heat change at this time and the differential heat curve is defined as the glass transition temperature Tg.

According to at least one aspect of the present disclosure, it is possible to obtain an electrophotographic belt that contributes to the stable formation of high-quality electrophotographic images over a long period of time. Further, according to at least one aspect of the present disclosure, it is possible to obtain an electrophotographic image forming apparatus that can stably form high-quality electrophotographic images.

EXAMPLES

The present invention will be specifically explained below with reference to Examples and Comparative Examples, but the present invention is not limited thereto. The materials used to manufacture the cylindrical films according to Examples and Comparative Examples are shown below.

TABLE 1

| Abbreviation | Material name (trade name or the like) |
|---|---|
| Crystalline polyester 1 (cPES1) | Polyethylene terephthalate (trade name: TRN-8550FF, manufactured by Teijin Ltd.) |
| Crystalline polyester 2 (cPES2) | Polyethylene naphthalate (trade name: TN-8050SC, manufactured by Teijin Ltd.) |
| Ion conductive agent (IC) | Lithium bis(trifluoromethanesulfonyl)imide (trade name: EF-N115, manufactured by Mitsubishi Materials Electronic Chemicals) |
| Non-conductive elastomer (ES1) | Styrene butadiene copolymer (trade name: Tuftec M1913; manufactured by Asahi Kasei Corporation) |
| Acrylic resin 1 (AES1) | Acrylic copolymer (trade name: KURARITY LA4285, manufactured by Kuraray Co., Ltd.) |
| Acrylic resin 2 | Acrylic copolymer |

TABLE 1-continued

| Abbreviation | Material name (trade name or the like) |
|---|---|
| (AES2) | (trade name: KURARITY LK9243, manufactured by Kuraray Co., Ltd.) |

The physical properties of the materials in the table are as follows.

TRN-8550FF: weight-average molecular weight of 50,000 to 80,000.

TN-8050SC: weight-average molecular weight of 20,000 to 80,000.

KURARITY LA4285: weight-average molecular weight of 10,000 to 100,000, $R^1$ in formula (a1) is hydrogen, $R^2$ is a butyl group, $R^3$ in formula (a2) is a methyl group, and $R^4$ is a methyl group.

KURARITY LK9243: weight-average molecular weight of 10,000 to 100,000, $R^1$ in formula (a1) is hydrogen, $R^2$ is a 2-ethylhexyl group, $R^3$ in formula (a2) is a methyl group, and $R^4$ is a methyl group.

TABLE 2

| Abbreviation | Material name (trade name) |
|---|---|
| Amorphous polyester 1 (aPES1) | Amorphous polyester (trade name: Vylon GK640, manufactured by Toyobo Co., Ltd.). |
| Amorphous polyester 2 (aPES2) | Amorphous polyester (trade name: Vylon GK880, manufactured by Toyobo Co., Ltd.). |
| Carbon black 1 (CB1) | Conductive carbon black (trade name: Ketjen Black EC300J, manufactured by Lion Specialty Chemicals Co., Ltd.) |
| Carbon black 2 (CB2) | Conductive carbon black (trade name: Ketjen Black EC600JD, manufactured by Lion Specialty Chemicals Co., Ltd.) |
| Carbon black 3 (CB3) | Conductive carbon black (trade name: Toka Black #5500, manufactured by Tokai Carbon Co., Ltd.) |
| Ion-conductive elastomer (ES2) | Polyether ester amide (trade name: Pelestat NC6321, manufactured by Sanyo Chemical Industries Co., Ltd.) |

The physical properties of the materials in the table are as follows.

Vylon GK640: has a structure corresponding to ethylene terephthalate and a structure corresponding to propylene terephthalate. Weight-average molecular weight is 10,000 to 40,000.

Vylon GK880: has a structure corresponding to ethylene terephthalate and a structure corresponding to propylene terephthalate. Weight-average molecular weight is 10,000 to 40,000.

TABLE 3

| Abbreviation | Material name (trade name or the like) |
|---|---|
| AN | Dipentaerythritol penta-/hexa-acrylate (trade name: Aronix M-402, manufactured by Toagosei Chemical Industry Co., Ltd.) |
| PTFE | PTFE particles (trade name: Lublon L-2, manufactured by Daikin Industries, Ltd.) |
| GF | PTFE particle dispersing agent (trade name: GF-300, manufactured by Toagosei Chemical Industry Co., Ltd.) |
| SL | Slurry of zinc antimonate particles (trade name: Celnax CX-Z400K manufactured by Nissan Chemical Industries, Ltd. 40% by mass of zinc antimonate particle component) |

TABLE 3-continued

| Abbreviation | Material name (trade name or the like) |
|---|---|
| IRG | Photopolymerization initiator (trade name: Irgacure 907, manufactured by BASF) |

Methods for Measuring and Evaluating Characteristic Values

Methods for measuring and evaluating the characteristic values of the cylindrical films according to Examples and Comparative Examples are as follows (1) to (5).

(Evaluation 1) Evaluation of Surface Resistivity (1-1) Measurement of Surface Resistivity (Ap, Bp) in the Circumferential Direction The surface resistivity of the inner circumferential surface of the cylindrical film in the circumferential direction was measured as follows according to the method based on JIS-K6911:2006.

As a measuring device, a high resistance meter (trade name: Hiresta UP MCP-HT450 model, manufactured by Nittoseiko Analytech Co., Ltd. (former company name: Mitsubishi Chemical Analytech Co., Ltd.)) was used. Further, as a probe, a 2-pin probe "UA" (trade name, manufactured by Nittoseiko Analytech Co., Ltd. (former company name: Mitsubishi Chemical Analytech Co., Ltd.)) was used. The probe was placed on the inner circumferential surface of the cylindrical film so that the direction of the straight line (line segment) connecting the two pins was parallel to the circumferential direction of the cylindrical film.

The surface resistivity is the surface resistance value per unit area (1 $cm^2$) of the electrophotographic belt, and the unit is [Ω/□].

Measurement of Ap

The produced cylindrical film was allowed to stand for 24 h in an environmental test chamber controlled to a temperature of 23° C. and a relative humidity of 50%. Thereafter, a DC voltage of 250 V was applied between the two pins of the probe for 10 sec in an environment at a temperature of 23° C. and a relative humidity of 50%, and the surface resistivity of the cylindrical film in the circumferential direction was measured. The surface resistivity was measured at the following four locations (four points) on the inner circumferential surface of the cylindrical film, and the average value of the obtained surface resistivity was taken as the surface resistivity Ap of the inner circumferential surface of the cylindrical film at room temperature and normal humidity.

Surface Resistivity Measurement Location (Measurement Point):

A total of four points including two points at +110 mm from the midpoint in the axial direction at a position determined as a reference in the circumferential direction of the cylindrical film (hereinafter referred to as the "reference position") toward both ends in the axial direction, and two points at +110 mm from the midpoint in the axial direction at a position at 180° from the reference position in the circumferential direction toward both ends in the axial direction.

Measurement of Bp

The produced cylindrical film was allowed to stand for 24 h in an environmental test chamber controlled to a temperature of 30° C. and a relative humidity of 80%. Thereafter, in an environment at a temperature of 30° C. and a relative humidity of 80%, the surface resistivity was measured at four locations on the inner circumferential surface of the cylindrical film in the same manner as in the measurement of Ap described above. The average value of the obtained surface resistivities was taken as the surface resistivity Bp of the cylindrical film in the circumferential direction at high temperature and high humidity.

Furthermore, Ap/Bp was calculated from the obtained Ap and Bp and was used as an index of environmental variations in surface resistivity in the circumferential direction of the inner circumferential surface due to temperature and humidity.

(1-2) Measurement of Surface Resistivity Aa and Ba in the Axial Direction

The measurements were performed in the same manner as in the method for measuring surface resistivities Ap and Bp described in (1-1) above, except that in the methods for measuring surface resistivities Ap and Bp, the two-pin probe was arranged so that the direction of the straight line (line segment) connecting the two pins was parallel to the axial direction. Then, Aa/Ba was calculated from the obtained Aa and Ba and was used as an index of environmental variations in surface resistivity in the axial direction of the inner circumferential surface due to temperature and humidity.

(Evaluation 2) Evaluation of Tensile Modulus of Elasticity

The tensile modulus of elasticity was measured in an environment with a temperature of 23° C. and a relative humidity of 50% by using a low-load universal material testing machine (trade name: 34TM-5; manufactured by Instron Corp.) equipped with a 5 kN load cell.

A test piece 1 measuring 100 mm in the circumferential direction×20 mm in the axial direction and a test piece 2 measuring 20 mm in the circumferential direction×100 mm in the axial direction were cut out from the produced cylindrical film. The thickness of each test piece was the total thickness of the cylindrical film.

Then, each test piece was gripped with a pneumatic grip with a distance between chucks of 50 mm. The gripped test piece was pulled at a constant speed of 5 mm/min, and the tensile modulus of elasticity was calculated from the stress value at 0.25% strain based on the obtained stress-strain curve and the thickness of the electrophotographic belt.

The average value was calculated from the measurement results for five test pieces, each being cut out from the same cylindrical film, the average value of the measurement results obtained using test piece 1 was taken as the tensile modulus Ep of elasticity in the circumferential direction of the cylindrical film, and the average value of the measurement results obtained using test piece 2 was taken as the tensile modulus Ea of elasticity in the axial direction of the cylindrical film.

(Evaluation 3) Evaluation of Contraction Rate

The contraction rate was measured by the following method as an index of the contraction stress of the cylindrical film. The contraction rate was measured using a thermomechanical analyzer (trade name: TMA/SDTA841 type; manufactured by Mettler Toledo) under the following conditions, and the change in the distance between the chucks was defined as the dimensional change of the sample.

A test piece A measuring 5 mm in the circumferential direction×20 mm in the axial direction and a test piece B measuring 20 mm in the circumferential direction×5 mm in the axial direction were cut out from the produced cylindrical film. The thickness of each test piece was the total thickness of the cylindrical film.

Each test piece was gripped with a distance between chucks of 10 mm and a load of 0.01 N, and held at 25° C. for 10 min. Thereafter, the temperature was raised at a rate of 5° C./min to a temperature 10° C. higher than the glass transition temperature of the test piece, maintained for 30 min, and then lowered again to 25° C. at a rate of 5° C./min.

The contraction rate α (unit: %) was calculated using the following formula, where the distance between the chucks before the temperature was raised was x1 and the distance between the chucks at the end was x2.

$$\alpha = (x1 - x2)/x1 \times 100$$

The average value was calculated from the measurement results for five test pieces each cut out from the same cylindrical film, and the average value of the measurement results obtained using test piece B was defined as contraction rate αp in the circumferential direction of the cylindrical film, and the average value of the measurement results obtained using test piece A was defined as contraction rate αa in the axial direction of the cylindrical film. When expansion occurred, the contraction rate value was expressed as a negative value.

(Evaluation 4) Evaluation of Average Alignment Degrees Fc1 and Fc2 and Average Alignment Angles Φc1 and Φc2 of Carbon Black A sample with a length of 5 mm in the circumferential direction, a length of 5 mm in the direction orthogonal to the circumferential direction (axial direction), and a thickness equal to the full thickness of the cylindrical film was cut out from a freely determined position of the produced biaxially stretched cylindrical film.

Sectioning Device (Product Name: Cryomicrotome; Manufactured by Leica Microsystems)

This sample showed a first cross section in the thickness and a direction along the circumferential direction of the biaxially stretched cylindrical film and a second cross section in the thickness and a direction along the axial direction of the biaxially stretched cylindrical film. The first cross section and the second cross section were polished using an ion beam. A Cross Section Polisher (trade name: SM09010; manufactured by JEOL Ltd.) was used for the polishing process. The polishing process was performed by setting the applied voltage to 4.5 V under an argon gas atmosphere, and irradiating each cross section with an ion beam for 11 h.

Next, the polished first and second cross sections were stained with ruthenium tetroxide.

Next, the stained first cross section was observed with a scanning electron microscope (SEM) to confirm the presence of the first phase and the second phase. Next, an image (SEM image) of a square observation area of 5 μm in length×5 μm in width was acquired at a predetermined position on the first cross section. At this time, adjustment was made so that the vertical direction of the SEM image was parallel to the thickness direction of the cylindrical film, and the horizontal direction of the SEM image was parallel to the circumferential direction of the cylindrical film. The resolution was set to be sufficient to analyze the carbon black appearing in the first cross section (for example, 2000 pixels vertically by 2000 pixels horizontally).

Next, a binarization process was performed on the obtained SEM image so that the carbon black was white and the material other than the carbon black, such as the amorphous resin, was black to obtain a binarized image. In the binarization process, the Otsu method described in IEEE Transactions on SYSTEMS, MAN, AND CYBERNETICS, vol. SMC-9, No. 1, January 1979, pp 62-66 was used. Further, for the binarization process image processing software "ImageJ" (trade name, manufactured by the National Institutes of Health, USA) was used.

Next, a two-dimensional Fourier transform was performed on the obtained binarized image, and the power spectrum was integrated in the circumferential direction of the cylindrical film to obtain an ellipse plot representing the direction of alignment and the degree of alignment of carbon black in the circumferential direction (see FIG. 7A). From the obtained ellipse plot, the alignment degree fc1 and the alignment angle φc1 of carbon black in the first cross section were determined.

These operations were performed on a total of 20 samples taken from freely determined positions on the cylindrical film to be evaluated, and the average values of the alignment degree fc1 and alignment angle φc1 of each sample were determined, and Fc1 and Φc1 were calculated.

Furthermore, for the second cross section of the sample, fc2 and φc2 were determined in the same manner as above, and then, the average alignment degree Fc2 and the average alignment angle Φc2 were calculated.

(Evaluation 5) Evaluation of Surface Peeling Resistance

The produced electrophotographic belt was allowed to stand for 12 h in an environmental test chamber controlled to a temperature of 23° C. and a relative humidity of 50%. Thereafter, the produced electrophotographic belt was mounted as an intermediate transfer belt in a drum cartridge of a full color electrophotographic image forming apparatus (trade name: LBP-5200, manufactured by Canon Inc.) under an environment of a temperature of 23° C. and a relative humidity of 50%. Using this electrophotographic image forming apparatus, cyan toner and magenta toner were superimposed on a recording material to output a purple solid image. The number of blank dot images was visually measured for the images formed on the first, 50,000th, and 100,000th sheets of recording material on which images were output.

(Evaluation 6) Evaluation of Amount of Wear on Inner Circumferential Surface of Electrophotographic Belt (Cylindrical Film)

A friction player (trade name: FPR-2100 model, manufactured by RHESCA Co., Ltd.) was used to measure the amount of wear on the inner circumferential surface of the electrophotographic belt. High-density felt (trade name: ½" Polishing Stick CS-7 (Felt), manufactured by TABER INDUSTRIES) was used as a contactor.

Sample pieces of 50 mm in the circumferential direction and 50 mm in the axial direction orthogonal to the circumferential direction were cut out from 20 freely determined locations on the electrophotographic belt, and the contactor fixed to a measurement terminal was brought into contact with the inner circumferential surface of the electrophotographic belt.

In an environment with a temperature of 23° C. and a relative humidity of 50%, a 400 g weight was fixed on the measurement terminal to which the contactor was fixed in order to apply a load between the contactor and the sample piece. Thereafter, a wear test was carried out by performing a linear reciprocating motion at a linear velocity of 50 mm/sec, a reciprocation width of 10 mm, and a number of reciprocations of 100,000.

Before carrying out the wear test, the weight of the sample piece was measured, the weight difference between this weight and the weight of the sample piece from which the abrasion powder generated after the wear test had been removed was taken as a wear amount L, and the total wear amount obtained from the wear test at 20 locations was defined as the wear amount Lt.

Example 1

Production Example of Cylindrical Film

Preparation of Crystalline Polyester Mixture

A pre-blended sample was prepared by mixing cPES1 and AES1 shown in Table 1 at the blending ratio shown in Table 4. This pre-blended sample was melt-kneaded using a twin-screw extruder (trade name: TEX30α, manufactured by Japan Steel Works, Ltd.) to prepare a crystalline polyester mixture. The melt-kneading temperature was adjusted to be within the range of 230° C. to 300° C., and the melt-kneading time was 3 min to 5 min.

The obtained crystalline polyester mixture was pelletized and dried at a temperature of 140° C. for 10 h.

Preparation of Amorphous Polyester Mixture

A pre-blended sample was prepared by mixing aPES1 and CB1 shown in Table 2 at the blending ratio shown in Table 4. This pre-blended sample was melt-kneaded using a twin-screw extruder (trade name: TEX30α, manufactured by Japan Steel Works, Ltd.) to prepare an amorphous polyester mixture. The melt-kneading temperature was adjusted to be within the range of 190° C. to 270° C., and the hot-melt-kneading time was 3 min to 5 min.

The obtained amorphous polyester mixture was pelletized and dried at a temperature of 90° C. for 10 h.

Next, the pellets of the crystalline polyester mixture and the pellets of the amorphous polyester mixture were placed in an injection molding machine (trade name: SE180D, manufactured by Sumitomo Heavy Industries, Ltd.) at the blending ratio shown in Table 4. The cylinder temperature was set at 250° C. to 300° C., and the mixture was injected into a cavity with a temperature adjusted to 30° C., thereby molding a preform having a test tube shape. The obtained preform had a test tube shape with an outer diameter of 50 mm, an inner diameter of 46 mm, a length of 150 mm, and a thickness of 2 mm.

Next, the above preform was biaxially stretched in the axial direction and circumferential direction thereof by using a biaxial stretching molding device.

First, as shown in FIG. 3A, the preform 205 was placed in a heating device 301 equipped with a non-contact type heater (not shown) for heating the preform 205, and the preform was heated with the heater so that the outer surface temperature was 100° C. to 160° C.

Next, the blow mold 303 with the mold temperature maintained at 30° C. was lowered in the direction of arrow 307 relative to the heated preform 205, and the heated preform 205 was placed in the mouth of the blow mold 303 (FIG. 3B).

Next, as shown in FIG. 3C, the stretching rod 309 was driven in the direction of arrow 311, and at the same time as the driving of the stretching rod was started, air with a temperature adjusted to 23° C. was introduced into the preform 205 through the mouth thereof as shown by arrow 313 in FIG. 3C. In this way, the preform 205 was biaxially stretched and brought into close contact with the inner wall of the blow mold. The driving speed of the stretching rod 309 was 2.0 m/sec, and the pressure of the air introduced into the blow bottle was 0.5 MPa.

Next, the left mold 303-1 and the right mold 303-2 of the blow mold 303 were separated, and the bottle-shaped molded product (blow bottle) 317 was taken out from the blow mold 303.

Next, the obtained blow bottle 317 was set in the nickel cylindrical mold 401 made by the electroforming method and shown in FIGS. 4A and 4B, and the outer mold 405 was mounted thereon. An air pressure of 0.1 MPa was applied inside the blow bottle and adjusted so that air would not leak to the outside, thereby bringing the outer circumferential surface of the blow bottle 317 into close contact with the inner circumferential surface of the cylindrical mold. Further, the entire circumference of the blow bottle was uniformly heat-treated at 130° C. to 190° C. for 60 sec using the heater 403 while rotating the nickel cylindrical mold 401 at a constant speed of 2 rotations/sec.

After that, air at a temperature of 25° C. was blown into the nickel cylindrical mold to cool the mold to room temperature (25° C.), the air pressure applied inside the blow bottle 317 was released, and the blow bottle 317 with dimensions improved by annealing was obtained. Based on the dimensions of the preform 205 and the blow bottle 317, the biaxial stretching ratio was as follows: lateral stretching ratio (circumferential direction) Lp=4.0 times and longitudinal stretching ratio (direction orthogonal to the circumferential direction) La=4.3 times.

Next, as shown in FIG. 3D, the portion on the mouth side of the blow bottle 317 and the portion on the opposite side to the mouth side were cut to produce a cylindrical film with a circumference of 630 mm, a width of 250 mm, and a thickness of 70 μm.

Preparation of Coating Liquid for Surface Layer

The (meth)acrylic resin mixture described in Table 3 was weighed at the ratios of AN/PTFE/GF/SL/IRG=66/20/1.0/12/1.0 (mass ratio in terms of solid matter), and rough dispersion treatment was performed to obtain a solution. The obtained solution was dispersed using a high-pressure emulsification disperser (trade name: NanoVater, manufactured by Yoshida Kikai Co., Ltd.). The main dispersion treatment was performed until the 50% average particle size of the contained PTFE was 200 nm. The obtained dispersion liquid was used as a coating liquid for a surface layer (a composition containing an active energy ray-curable resin such as a photocurable resin).

Formation of Surface Layer

The prepared cylindrical film was fitted into the outer periphery of a cylindrical mold (circumference: 630 mm), the ends were sealed, and the film with the mold were immersed in a container filled with the coating liquid for a surface layer and then pulled up so that the relative speed between the liquid level of the curable composition and the base layer of the electrophotographic belt was constant. In this way, a coating film made of the coating liquid for a surface layer was formed on the surface of the electrophotographic belt base layer.

As mentioned above, the pull-up speed (relative speed between the liquid level of the curable composition and the electrophotographic belt base layer) and the solvent ratio of the curable composition can be adjusted according to the required thickness of the surface layer.

In this example, the pull-up speed was adjusted to 10 mm/sec to 50 mm/sec, and the thickness of the surface layer was adjusted to approximately 3 μm. The cylindrical film coated with the coating solution was removed from the cylindrical mold and dried for 1 min in an environment of 23° C. under degassing. The drying temperature and drying time were adjusted, as appropriate, based on the solvent type, solvent ratio, and film thickness.

Thereafter, the coating film was cured by irradiation with ultraviolet rays using a UV irradiation machine (trade name: UE06/81-3, manufactured by Eye Graphics Co., Ltd.) until the cumulative light quantity reached 600 mJ/cm$^2$. In this way, an electrophotographic belt having a cylindrical film as a base layer was obtained.

The thickness of the surface layer was determined by a destructive test in which an electrophotographic belt base layer separately prepared under the same conditions was cut and the cross section was observed under an electron microscope (trade name: XL30-SFEG, manufactured by FEI Corporation).

The results of the destructive test showed that the thickness of the surface layer was 2.8 km. In this way, an electrophotographic belt was obtained in which a surface layer was formed on the outer peripheral surface of the base layer. This electrophotographic belt was subjected to Evaluations 1 to 6. The binarized images shown in FIGS. 6A and 6B were obtained from the cylindrical film produced in this example.

Examples 2 to 4

Electrophotographic belts were produced and evaluated in the same manner as in Example 1, except that the cPES species, aPES species, AES species, and CB species and the blending ratio were as shown in Tables 1, 2, and 4.

Example 5

Preparation of Crystalline Polyester Mixture

Pellets of a crystalline polyester mixture were prepared in the same manner as the crystalline polyester mixture of Example 1, except that the blending ratios of cPES1, AES1, and ES1 were as shown in Table 4.

Preparation of Amorphous Polyester Mixture

Pellets of an amorphous polyester mixture were prepared in the same manner as the amorphous polyester mixture of Example 1, except that the blending ratio of aPES1, and CB3 was as shown in Table 4.

Next, a preform was produced in the same manner as in Example 1, except that the pellets of the crystalline polyester mixture and the pellets of the amorphous polyester mixture were used at the blending ratio shown in Table 4. Further, an electrophotographic belt according to Example 5 was produced by producing a cylindrical film and forming a surface layer in the same manner as in Example 1, except that the obtained preform was used. The obtained electrophotographic belt was subjected to Evaluations 1 to 6.

Examples 6 to 10

Preparation of Crystalline Polyester Mixture

The cPES species and AES species were as shown in Tables 1, 2, and 4, and the cPES species, AES species, and ES1 were mixed at the blending ratios shown in Table 4, to prepare pre-blended samples of each example. Each pre-blended sample was melt-kneaded using a twin-screw extruder (trade name: TEX30α, manufactured by Japan Steel Works, Ltd.) to obtain a crystalline polyester mixture according to each example. The melt-kneading temperature was adjusted to be within the range of 260° C. to 310° C., and the melt-kneading time was 3 min to 5 min. Each of the resulting crystalline polyester mixtures was pelletized and dried at a temperature of 140° C. for 10 h.

Preparation of Amorphous Polyester Mixture

Pellets of an amorphous polyester mixture according to each of Examples 6 to 10 were prepared in the same manner as the amorphous polyester mixture of Example 1, except that the aPES species, the CB species, and the blending ratios thereof were such as shown in Tables 1, 2, and 4.

Next, the pellets of the crystalline polyester mixture and the pellets of the amorphous polyester mixture were loaded in an injection molding machine (trade name: SE180D, manufactured by Sumitomo Heavy Industries, Ltd.) at the blending ratio shown in Table 4. Then, a cylinder temperature was set at 280° C. to 320° C., and a preform was produced by injection molding into a test tube-shaped mold with the temperature controlled at 30° C. The obtained preform had a test tube shape with an outer diameter of 50 mm, an inner diameter of 46 mm, a length of 150 mm, and a thickness of 2 mm.

An electrophotographic belt according to each example was produced by producing a cylindrical film and forming a surface layer in the same manner as in Example 1, except that the obtained preforms were used. The obtained electrophotographic belt was subjected to Evaluations 1 to 6.

Examples 11 and 12 Electrophotographic belts were produced and evaluated in the same manner as in Example 1, except that the cPES species, aPES species, and CB species were as shown in Tables 1, 2, and 4, and the blending ratios of the cPES species, aPES species, AES1, CB species, ES1, and IC were as shown in Table 4.

TABLE 4

| Material | Example | | | | | | | | | | | |
|---|---|---|---|---|---|---|---|---|---|---|---|---|
| abbreviation | 1 | 2 | 3 | 4 | 5 | 6 | 7 | 8 | 9 | 10 | 11 | 12 |
| cPES1 [% by mass] | 76.0 | 63.0 | 50.0 | 56.0 | 50.0 | 0.0 | 0.0 | 60.5 | 3.0 | 23.0 | 75.9 | 51.5 |
| cPES2 [% by mass] | 0.0 | 0.0 | 0.0 | 0.0 | 0.0 | 72.5 | 51.0 | 10.0 | 60.0 | 30.0 | 0.0 | 0.0 |
| aPES1 [% by mass] | 20.0 | 28.0 | 36.0 | 0.0 | 24.0 | 0.0 | 0.0 | 8.0 | 4.0 | 6.0 | 20.0 | 34.0 |
| aPES2 [% by mass] | 0.0 | 0.0 | 0.0 | 35.0 | 0.0 | 22.0 | 35.0 | 16.0 | 18.0 | 15.0 | 0.0 | 0.0 |
| AES1 [% by mass] | 2.0 | 5.0 | 8.0 | 0.0 | 6.0 | 3.0 | 8.0 | 0.0 | 5.0 | 8.0 | 2.0 | 8.0 |
| AES2 [% by mass] | 0.0 | 0.0 | 0.0 | 5.0 | 0.0 | 0.0 | 0.0 | 3.0 | 0.0 | 0.0 | 0.0 | 0.0 |
| CB1 [% by mass] | 2.0 | 4.0 | 6.0 | 0.0 | 0.0 | 2.5 | 0.0 | 0.0 | 4.0 | 8.0 | 2.0 | 0.0 |
| CB2 [% by mass] | 0.0 | 0.0 | 0.0 | 4.0 | 0.0 | 0.0 | 6.0 | 2.5 | 0.0 | 0.0 | 0.0 | 6.0 |
| CB3 [% by mass] | 0.0 | 0.0 | 0.0 | 0.0 | 15.0 | 0.0 | 0.0 | 0.0 | 0.0 | 0.0 | 0.0 | 0.0 |
| ES1 [% by mass] | 0.0 | 0.0 | 0.0 | 0.0 | 5.0 | 0.0 | 0.0 | 0.0 | 6.0 | 10.0 | 0.0 | 0.0 |
| IC [% by mass] | 0.0 | 0.0 | 0.0 | 0.0 | 0.0 | 0.0 | 0.0 | 0.0 | 0.0 | 0.0 | 0.1 | 0.5 |

Comparative Example 1

A pre-blended sample was prepared in which CB3 and ES2 were mixed in the proportion shown in Table 5. This pre-blended sample was melt-kneaded using a kneader at a temperature of 210° C., and then extruded to produce a sheet. The obtained sheet was cut to obtain pellets. The obtained pellets and cPES1 and cPES2 were loaded into an injection molding machine (trade name: SE180D, manufactured by Sumitomo Heavy Industries, Ltd.) at the blending ratio shown in Table 5. Then, a cylinder temperature was set at 250° C. to 300° C., and a preform having a test tube shape was molded by injection molding into a cavity with the temperature controlled at 30° C. The obtained preform had a test tube shape with an outer diameter of 50 mm, an inner diameter of 46 mm, a length of 150 mm, and a thickness of 2 mm. An electrophotographic belt according to the present comparative example was produced by producing a cylindrical film and forming a surface layer in the same manner as in Example 1, except that the obtained preform was used. The obtained electrophotographic belt was subjected to Evaluations 1 to 6.

Comparative Example 2

A pre-blended sample was prepared in which cPES1, aPES1, AES1 and CB1 were mixed in the proportions shown in Table 5. This preblended sample was hot-melt-kneaded using a twin-screw extruder (trade name: TEX30α, manufactured by Japan Steel Works, Ltd.). The kneading temperature was adjusted to be within the range of from 220° C. to 300° C., and the kneading time was 3 min to 5 min. The resulting resin mixture was pelletized and dried at a temperature of 140° C. for 10 h. A preform was molded in the same manner as in Example 1, except that only the thus obtained resin mixture pellets for forming a preform were used. Then, a biaxially stretched cylindrical film was produced and a surface layer was formed on the outer circumferential surface of the biaxially stretched cylindrical film in the same manner as in Example 1, except that the obtained preform was used, to obtain an electrophotographic belt according to Comparative Example 2. The obtained electrophotographic belt was subjected to Evaluations 1 to 6.

TABLE 5

| Material | Comparative example | |
|---|---|---|
| abbreviation | 1 | 2 |
| cPES1 [% by mass] | 50.0 | 76.0 |
| aPES1 [% by mass] | 10.0 | 20.0 |
| AES1 [% by mass] | 0.0 | 2.0 |
| CB1 [% by mass] | 0.0 | 2.0 |
| CB2 [% by mass] | 0.0 | 0.0 |
| CB3 [% by mass] | 25.0 | 0.0 |
| IC [% by mass] | 0.0 | 0.0 |
| ES2 [% by mass] | 15.0 | 0.0 |

The evaluation results of Examples 1 to 12 and Comparative Examples 1 to 2 are shown in Table 6-1, Table 6-2, and Table 7.

TABLE 6-1

| | Example | | | | | |
|---|---|---|---|---|---|---|
| Material abbreviation | 1 | 2 | 3 | 4 | 5 | 6 |
| Lateral stretching ratio Lp [times] | 4.0 | 4.0 | 4.0 | 4.0 | 4.0 | 4.0 |
| Longitudinal stretching ratio La [times] | 4.3 | 4.3 | 4.3 | 4.3 | 4.3 | 4.3 |
| Average alignment degree Fc1 in cross section along longitudinal direction | 0.58 | 0.46 | 0.43 | 0.50 | 0.38 | 0.51 |
| Average alignment angle ϕc1 in cross section along longitudinal direction [°] | +1 | +2 | +2 | +2 | +5 | +1 |
| Average alignment degree Fc2 in cross section along axial direction | 0.52 | 0.51 | 0.42 | 0.46 | 0.36 | 0.47 |
| Average alignment angle ϕc2 in cross section along axial direction [°] | +1 | +1 | +2 | +3 | +6 | +1 |
| Surface resistivity Ap (Ω/□) under environment with a temperature of 23°C and a relative humidity of 50% | 1.10E+10 | 7.40E+09 | 4.60E+09 | 5.80E+09 | 6.80E+10 | 8.10E+09 |
| Surface resistivity Bp (Ω/□) under environment with a temperature of 30° C. and a relative humidity of 80% | 1.00E+10 | 6.80E+09 | 4.30E+09 | 5.30E+09 | 6.60E+10 | 7.60E+09 |
| Ap/Bp | 1.10 | 1.09 | 1.07 | 1.09 | 1.03 | 1.07 |
| Surface resistivity Aa (Ω/□) under environment with a temperature of 23° C. and a relative humidity of 50% | 1.00E+10 | 6.50E+09 | 4.40E+09 | 5.70E+09 | 6.70E+10 | 7.70E+09 |
| Surface resistivity Ba (Ω/□) under environment with a temperature of 30° C. and a relative humidity of 80% | 9.30E+09 | 5.90E+09 | 4.10E+09 | 5.20E+09 | 6.40E+10 | 7.30E+09 |
| Aa/Ba | 1.08 | 1.10 | 1.07 | 1.10 | 1.05 | 1.05 |
| Elastic modulus Ep [MPa] | 1233 | 1258 | 1324 | 1277 | 1342 | 1311 |
| Elastic modulus Ea [MPa] | 1285 | 1287 | 1350 | 1302 | 1286 | 1335 |
| Contraction rate αp [%] | 5.35 | 5.16 | 5.09 | 4.96 | 4.86 | 3.50 |
| Contraction rate αa [%] | 5.41 | 5.19 | 5.14 | 5.02 | 4.97 | 3.53 |
| Number of blank dot pixels on first sheet [number] | 0 | 0 | 0 | 0 | 0 | 0 |
| Number of blank dot pixels on 50,000th sheet [number] | 0 | 0 | 0 | 0 | 0 | 0 |
| Number of blank dot pixels on 100,000th sheet [number] | 0 | 0 | 0 | 0 | 0 | 0 |
| Wear amount Lt (g) | 0.003 | 0.003 | 0.002 | 0.004 | 0.011 | 0.004 |

TABLE 6-2

| | Example | | | | | |
|---|---|---|---|---|---|---|
| Material abbreviation | 7 | 8 | 9 | 10 | 11 | 12 |
| Lateral stretching ratio Lp [times] | 4.0 | 4.0 | 4.0 | 4.0 | 4.0 | 4.0 |
| Longitudinal stretching ratio La [times] | 4.3 | 4.3 | 4.3 | 4.3 | 4.3 | 4.3 |
| Average alignment degree Fc1 in cross section along longitudinal direction | 0.35 | 0.57 | 0.42 | 0.35 | 0.49 | 0.42 |
| Average alignment angle ϕc1 in cross section along longitudinal direction [°] | +10 | +1 | +4 | +3 | +1 | +3 |
| Average alignment degree Fc2 in cross section along axial direction | 0.39 | 0.59 | 0.44 | 0.33 | 0.52 | 0.40 |
| Average alignment angle ϕc2 in cross section along axial direction [°] | +8 | +2 | +3 | +3 | +1 | +5 |
| Surface resistivity Ap (Ω/□) under environment with a temperature of 23° C. and a relative humidity of 50% | 2.30E+09 | 6.50E+09 | 7.10E+09 | 9.70E+08 | 9.70E+09 | 4.20E+09 |
| Surface resistivity Bp (Ω/□) under environment with a temperature of 30° C. and a relative humidity of 80% | 2.20E+09 | 6.20E+09 | 6.60E+09 | 9.10E+08 | 8.00E+09 | 3.50E+09 |
| Ap/Bp | 1.05 | 1.05 | 1.08 | 1.07 | 1.21 | 1.20 |
| Surface resistivity Aa (Ω/□) under environment with a temperature of 23° C. and a relative humidity of 50% | 2.20E+09 | 6.20E+09 | 6.70E+09 | 9.10E+08 | 9.50E+09 | 4.00E+09 |
| Surface resistivity Ba (Ω/□) under environment with a temperature of 30° C. and a relative humidity of 80% | 2.10E+09 | 5.80E+09 | 6.30E+09 | 8.60E+08 | 7.90E+09 | 3.30E+09 |
| Aa/Ba | 1.05 | 1.07 | 1.06 | 1.06 | 1.20 | 1.21 |
| Elastic modulus Ep [MPa] | 1385 | 1260 | 1167 | 1117 | 1247 | 1325 |
| Elastic modulus Ea [MPa] | 1391 | 1285 | 1141 | 1102 | 1256 | 1348 |
| Contraction rate αp [%] | 3.34 | 4.39 | 4.22 | 4.12 | 5.21 | 5.03 |
| Contraction rate αa [%] | 3.38 | 4.41 | 4.15 | 4.09 | 5.27 | 5.10 |
| Number of blank dot pixels on first sheet [number] | 0 | 0 | 0 | 0 | 0 | 0 |

TABLE 6-2-continued

| | Example | | | | | |
|---|---|---|---|---|---|---|
| Material abbreviation | 7 | 8 | 9 | 10 | 11 | 12 |
| Number of blank dot pixels on 50,000th sheet [number] | 0 | 0 | 0 | 0 | 0 | 0 |
| Number of blank dot pixels on 100,000th sheet [number] | 0 | 0 | 0 | 0 | 0 | 0 |
| Wear amount Lt (g) | 0.008 | 0.005 | 0.004 | 0.010 | 0.006 | 0.009 |

In Tables 6-1 and 6-2, for example, 1.10E+10 indicates $1.10\times10^{10}$.

TABLE 7

| | Comparative Example | |
|---|---|---|
| Material abbreviation | 1 | 2 |
| Lateral stretching ratio Lp [times] | 4.0 | 4.0 |
| Longitudinal stretching ratio La [times] | 4.3 | 4.3 |
| Average alignment degree Fc1 in cross section along longitudinal direction | 0.41 | 0.02 |
| Average alignment angle Φc1 in cross section along longitudinal direction [°] | +4 | *1 |
| Average alignment degree Fc2 in cross section along axial direction | 0.43 | 0.03 |
| Average alignment angle Φc2 in cross section along axial direction [°] | +3 | *2 |
| Surface resistivity Ap (Ω/□) under environment with a temperature of 23° C. and a relative humidity of 50% | 7.30E+10 | 2.30E+12 |
| Surface resistivity Bp (Ω/□) under environment with a temperature of 30° C. and a relative humidity of 80% | 6.80E+09 | 1.40E+12 |
| Ap/Bp | 10.74 | 1.64 |
| Surface resistivity Aa (Ω/□) under environment with a temperature of 23° C. and a relative humidity of 50% | 6.40E+10 | 2.10E+12 |
| Surface resistivity Ba (Ω/□) under environment with a temperature of 30° C. and a relative humidity of 80% | 5.90E+09 | 1.30E+12 |
| Aa/Ba | 10.85 | 1.62 |
| Elastic modulus Ep [MPa] | 1078 | 1132 |
| Elastic modulus Ea [MPa] | 1049 | 1105 |
| Contraction rate αp [%] | 5.08 | 4.87 |
| Contraction rate αa [%] | 5.21 | 5.01 |
| Number of blank dot pixels on first sheet [number] | 0 | 0 |
| Number of blank dot pixels on 50,000th sheet [number] | 2 | 0 |
| Number of blank dot pixels on 100,000th sheet [number] | 8 | 4 |
| Wear amount Lt (g) | 0.175 | 0.027 |

*1,*2: The average alignment angles Φc1 and Φc2 could not be calculated because the values of the average alignment degrees Fc1 and Fc2 were extremely small.

In Table 7, for example, 7.30E+10 indicates $7.30\times10^{10}$.

In Examples 1 to 12, the number of blank dop pixels after the durability test was 0, and high image quality could be maintained even when a large number of electrophotographic images were formed. The reason for this is thought to be that in the electrophotographic belts according to Examples 1 to 12, the adhesion between the first phase and the second phase has increased due to the interaction between the amorphous polyester in the first phase and the crystalline polyester and carbon black in the second phase caused by the (meth)acrylic resin in the second phase.

Meanwhile, the wear resistance on the inner circumferential surface of the electrophotographic belt according to Comparative Example 1 was inferior to that of the electrophotographic belts according to the Examples. The reason for this is thought to be that in the electrophotographic belt according to Comparative Example 1, the adhesion was low at the interface between the phase comprising the crystalline polyester and the phase comprising the polyether ester amide in which carbon black was unevenly distributed in the base layer (cylindrical film), so that wear progressed early due to friction between the inner circumferential surface and the roller group. Furthermore, the number of white dot pixels on the 50,000th and 100,000th sheets was also large. The reason for this is thought to be that the adhesion was low at the interface between the phase comprising the crystalline polyester and the phase comprising the polyether ester amide in which carbon black was unevenly distributed in the base layer (cylindrical film), so that when the outer circumferential surface of the electrophotographic belt was rubbed during the formation of electrophotographic images, peeling progressed at the interface between the phase comprising the crystalline polyester and the phase comprising the polyether ester amide in the base layer, and part of the surface layer peeled off along with the base layer.

Furthermore, the wear resistance on the inner circumferential surface of the electrophotographic belt according to Comparative Example 2 was also inferior to that of the electrophotographic belts according to the Examples. The reason for this is thought to be as follows. In the electrophotographic belt according to Comparative Example 2, the orientation of carbon black substantially could not be confirmed and the average arrangement angles Φc1 and Φc2 could not be calculated in both the cross section in the thickness and the direction along the circumferential direction of the electrophotographic belt and the cross section in the thickness and the direction along the axial direction of the electrophotographic belt. That is, in the base layer of the electrophotographic belt according to Comparative Example 2, carbon black was relatively uniformly dispersed in the phase comprising the crystalline polyester and the phase comprising the amorphous polyester. It is thought that for this reason, as the inner circumferential surface of the electrophotographic belt was wearing down, carbon black was exposed on the inner circumferential surface, and the carbon black was falling off. It is thought that as a result, the inner circumferential surface became rougher and wear was accelerated, resulting in a relative decrease in wear resistance. Further, the electrophotographic belt according to Comparative Example 2 also had a large number of blank dot pixels at the 100,000th sheet. Although the reason is not clear, it is thought to be as follows. In the electrophotographic belt according to Comparative Example 2, the orientation of carbon black in the circumferential direction and the axial direction could not be confirmed. This means that a sufficient amount of carbon black was not present in the phase comprising the amorphous polyester. Carbon black in the phase comprising the amorphous polyester (first phase) is thought to contribute greatly to the improvement of adhesion between the phase comprising the crystalline polyester and the phase comprising the amorphous polyester. It is thought that this is why the adhesion between the phase comprising the crystalline polyester and the phase comprising the amorphous polyester in the base layer of the electrophotographic belt according to Comparative Example 2 was insufficient. It is thought that for this reason, in the formation of a large number of electrophotographic images, the outer circumferential surface of the electrophotographic belt was subjected to repeated rubbing, and the interface between the phase comprising the crystalline polyester and the phase comprising the amorphous polyester peeled off, and as a result, the surface layer partially peeled off.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-211718, filed Dec. 28, 2022, which is hereby incorporated by reference herein in its entirety.

What is claimed is:

1. An electrophotographic belt comprising a cylindrical film as a base layer, wherein the cylindrical film comprises a crystalline polyester, an amorphous polyester and a carbon black, a content ratio of the carbon black in the cylindrical film is 2.0% by mass or more, an average alignment degree Fc1 of the carbon black in a circumferential direction of the cylindrical film is 0.30 or more, and an average alignment angle Φc1 of the carbon black in the circumferential direction of the cylindrical film is −10° to +10° as observed in a square observation area of 5 μm in length×5 μm in width in a cross section of the cylindrical film in thickness and a direction along the circumferential direction of the cylindrical film, the cylindrical film has a first phase comprising the amorphous polyester and the carbon black, and a second phase comprising the crystalline polyester, and the second phase further comprises a (meth)acrylic resin having a structure represented by formula (a):

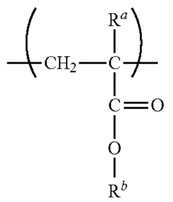

(a)

wherein, in the formula (a), $R^a$ represents a hydrogen atom or a methyl group, and $R^b$ represents an alkyl group having 1 to 8 carbon atoms.

2. The electrophotographic belt according to claim 1, wherein the (meth)acrylic resin has a structure represented by formula (a1) and a structure represented by formula (a2):

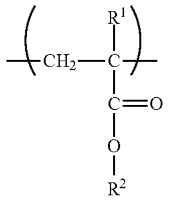

(a1)

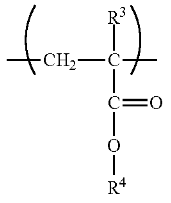

(a2)

wherein $R^1$ represents a hydrogen atom, $R^3$ represents a methyl group, and $R^2$ and $R^4$ each independently represent an alkyl group having 1 to 8 carbon atoms.

3. The electrophotographic belt according to claim 1, wherein the Fc1 is 0.30 to 0.99.

4. The electrophotographic belt according to claim 1, wherein the cylindrical film is a biaxially stretched cylindrical film.

5. The electrophotographic belt according to claim 1, wherein a content ratio of an ion conductive agent in the cylindrical film is 0.0% by mass to 2.0% by mass.

6. The electrophotographic belt according to claim 1, wherein the crystalline polyester comprises at least one selected from the group consisting of a polyalkylene terephthalate, a polyalkylene naphthalate, a polyalkylene isophthalate, and copolymers comprising these.

7. The electrophotographic belt according to claim 1, wherein the amorphous polyester has a structure corresponding to at least one selected from the group consisting of terephthalic acid, orthophthalic acid, and isophthalic acid, and a structure corresponding to at least two diols selected from the group consisting of ethylene glycol, diethylene glycol, propylene glycol, neopentyl glycol, and cyclohexanedimethanol.

8. The electrophotographic belt according to claim 1, wherein a content of the amorphous polyester is 100.0 parts by mass or less when a total content of the crystalline polyester and the (meth)acrylic resin is 100.0 parts by mass.

9. The electrophotographic belt according to claim 1, wherein the (meth)acrylic resin has a weight-average molecular weight of 10,000 to 100,000.

10. The electrophotographic belt according to claim 1, wherein a tensile modulus Ep in the circumferential direction of the cylindrical film and a tensile modulus Ea in the axial direction of the cylindrical film are 1000 MPa or more.

11. The electrophotographic belt according to claim 1, wherein a contraction rate αp in the circumferential direction of the cylindrical film and a contraction rate αa in an axial direction of the cylindrical film are 2.00% or more.

12. The electrophotographic belt according to claim 1, wherein the electrophotographic belt is an intermediate transfer belt.

13. The electrophotographic belt according to claim 1, wherein an average alignment degree Fc2 of the carbon black in an axial direction of the cylindrical film is 0.30 or more, and an average alignment angle Φc2 of the carbon black in the axial direction of the cylindrical film is −10° to +10° as observed in a square observation area of 5 μm in length×5 μm in width in a cross section of the cylindrical film in thickness and a direction along the axial direction of the cylindrical film.

14. The electrophotographic belt according to claim 13, wherein the Fc2 is 0.30 to 0.99.

15. The electrophotographic belt according to claim 1, wherein a surface resistivity Ap (Ω/□) in the circumferential direction of the cylindrical film measured on an inner circumferential surface of the cylindrical film in an environment of a temperature of 23° C. and a relative humidity of 50% is $1.00\times10^{3}$Ω/□ to $1.00\times10^{13}$Ω/□.

16. The electrophotographic belt according to claim 15, wherein a ratio value (Ap/Bp) of the Ap to a surface resistivity Bp (Ω/□) in the circumferential direction of the cylindrical film measured on the inner circumferential surface of the cylindrical film having been allowed to stand for 24 h in an environment with a temperature of 30° C. and a relative humidity of 80% is 3.00 or less.

17. The electrophotographic belt according to claim 1, wherein a surface resistivity Aa (Ω/□) in an axial direction of the cylindrical film measured on an inner circumferential surface of the cylindrical film in an environment of a temperature of 23° C. and a relative humidity of 50% is $1.00\times10^{3}$Ω/□ to $1.00\times10^{13}$Ω/□.

18. The electrophotographic belt according to claim 17, wherein a ratio value (Aa/Ba) of the Aa to a surface resistivity Ba (Ω/□) in an axial direction of the cylindrical film measured on the inner circumferential surface of the cylindrical film having been allowed to stand for 24 h in an environment with a temperature of 30° C. and a relative humidity of 80% is 3.00 or less.

19. An electrophotographic image forming apparatus comprising the electrophotographic belt according to claim 1 as an intermediate transfer belt.

20. The electrophotographic image forming apparatus according to claim 19, further comprising a plurality of rollers for tensioning and rotating the electrophotographic belt, the rollers being arranged in contact with an inner circumferential surface of the electrophotographic belt.

* * * * *